US008926452B2

(12) United States Patent
Morgan et al.

(10) Patent No.: US 8,926,452 B2
(45) Date of Patent: Jan. 6, 2015

(54) MULTILAYER GOLF BALL

(71) Applicant: Acushnet Company, Fairhaven, MA (US)

(72) Inventors: William E. Morgan, Barrington, RI (US); Hebert C. Boehm, Norwell, MA (US); Michael McNamara, Fairhaven, MA (US); Diomar Correia, Acushnet, MA (US); Donald A. Serino, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/021,362

(22) Filed: Sep. 9, 2013

(65) Prior Publication Data

US 2014/0011608 A1 Jan. 9, 2014

Related U.S. Application Data

(60) Continuation of application No. 13/904,078, filed on May 29, 2013, which is a division of application No. (Continued)

(51) Int. Cl.
*A63B 37/08* (2006.01)
*A63B 37/00* (2006.01)
(Continued)

(52) U.S. Cl.
CPC ......... *A63B 37/0056* (2013.01); *A63B 37/0003* (2013.01); *A63B 37/0052* (2013.01);
(Continued)

(58) Field of Classification Search
USPC .................................. 473/354, 372
See application file for complete search history.

(56) References Cited

U.S. PATENT DOCUMENTS

| 1,568,513 A | 1/1926 | Lewis |
| 1,904,012 A | 4/1933 | Reichard |

(Continued)

FOREIGN PATENT DOCUMENTS

| WO | WO 00/23519 A1 | 4/2000 |
| WO | WO 01/29129 A1 | 4/2001 |

*Primary Examiner* — Raeann Gorden
(74) *Attorney, Agent, or Firm* — Kristin D. Wheeler

(57) ABSTRACT

A method of making a ball, comprising: forming an inner core having a diameter of about 0.5 inches or lower; forming a plurality of outer core parts from an elastomeric material, each outer core part having an inner surface, an outer surface and at least one non planar mating surface, wherein the inner surface is concentrically disposed within the outer surface and comprises a cavity for receiving the inner core, and wherein the at least one nonplanar mating surface extends radially between the inner surface and the outer surface and comprises a plurality of mating ridges which extend from the inner surface to the outer surface; forming an outer core by mating the outer core parts about the inner core and joining the nonplanar mating surfaces by meshing the mating ridges to form a multi-layer core having a nonplanar parting line which extends about the outer surface circumferentially and intersects with the mating ridges at the outer surface; and molding a cover about the inner core, wherein the elastomeric material has a cohesive strength and the parting line has a mated strength equal to or greater than the cohesive strength.

20 Claims, 19 Drawing Sheets

Related U.S. Application Data

12/492,226, filed on Jun. 26, 2009, now abandoned, which is a continuation-in-part of application No. 12/275,615, filed on Nov. 21, 2008, now Pat. No. 7,591,742, which is a continuation of application No. 11/353,563, filed on Feb. 14, 2006, now Pat. No. 7,458,904, which is a continuation-in-part of application No. 10/670,514, filed on Sep. 26, 2003, now Pat. No. 7,041,007.

(51) Int. Cl.

| | | |
|---|---|---|
| *B29C 43/02* | (2006.01) | |
| *B29C 43/14* | (2006.01) | |
| *B29C 65/48* | (2006.01) | |
| *B29C 65/00* | (2006.01) | |
| *B29D 99/00* | (2010.01) | |
| *B29C 65/02* | (2006.01) | |
| *B29D 22/04* | (2006.01) | |
| *A63B 45/00* | (2006.01) | |
| *B29C 33/00* | (2006.01) | |
| *B29K 9/06* | (2006.01) | |
| *B29K 21/00* | (2006.01) | |
| *B29L 31/54* | (2006.01) | |
| *B29C 43/00* | (2006.01) | |
| *B29C 63/22* | (2006.01) | |

(52) U.S. Cl.
CPC ........ *A63B 37/0064* (2013.01); *A63B 37/0076* (2013.01); *B29C 43/027* (2013.01); *B29C 43/146* (2013.01); *B29C 65/48* (2013.01); *B29C 66/1142* (2013.01); *B29C 66/221* (2013.01); *B29C 66/54* (2013.01); *B29D 99/0042* (2013.01); *A63B 37/0075* (2013.01); *A63B 37/08* (2013.01); *B29C 65/02* (2013.01); *B29D 22/04* (2013.01); *A63B 45/00* (2013.01); *A63B 2037/085* (2013.01); *B29C 33/0022* (2013.01); *B29C 66/124* (2013.01); *B29C 66/12461* (2013.01); *B29C 2043/023* (2013.01); *B29K 2009/06* (2013.01); *B29K 2021/00* (2013.01); *B29L 2031/54* (2013.01); *B29L 2031/545* (2013.01); *A63B 37/0033* (2013.01); *A63B 37/0039* (2013.01); *A63B 37/0045* (2013.01); *A63B 37/0066* (2013.01); *A63B 37/0078* (2013.01); *B29C 43/00* (2013.01); *B29C 63/22* (2013.01)
USPC ........................................................ 473/354

(56) References Cited

U.S. PATENT DOCUMENTS

| | | |
|---|---|---|
| 2,998,977 A | 9/1961 | Molitor |
| 5,150,906 A | 9/1992 | Molitor et al. |
| 5,184,828 A | 2/1993 | Kim et al. |
| 5,306,760 A | 4/1994 | Sullivan |
| 5,312,857 A | 5/1994 | Sullivan |
| 5,480,155 A | 1/1996 | Molitor et al. |
| 5,482,285 A | 1/1996 | Yabuki et al. |
| 5,683,312 A | 11/1997 | Boehm et al. |
| 5,688,191 A | 11/1997 | Cavallaro et al. |
| 5,789,475 A | 8/1998 | Chen |
| 5,803,831 A | 9/1998 | Sullivan et al. |
| 5,902,855 A | 5/1999 | Sullivan |
| 5,962,140 A | 10/1999 | Rajagopalan |
| 5,973,046 A | 10/1999 | Chen et al. |
| 6,042,488 A | 3/2000 | Sullivan et al. |
| 6,083,119 A | 7/2000 | Sullivan et al. |
| 6,100,321 A | 8/2000 | Chen |
| 6,200,230 B1 | 3/2001 | Maruko |
| 6,238,304 B1 | 5/2001 | Scolamiero et al. |
| 6,244,977 B1 | 6/2001 | Sullivan et al. |
| 6,299,550 B1 | 10/2001 | Molitor et al. |
| 6,329,458 B1 | 12/2001 | Takesue et al. |
| 6,406,384 B2 | 6/2002 | Sullivan et al. |
| 6,561,927 B1 | 5/2003 | Sullivan et al. |
| 6,575,846 B1 | 6/2003 | Boehm et al. |
| 6,616,549 B2 | 9/2003 | Dalton et al. |
| 6,635,133 B1 | 10/2003 | Boehm et al. |
| 6,635,716 B2 | 10/2003 | Voorheis et al. |
| 6,743,123 B2 | 6/2004 | Sullivan |
| 6,756,436 B2 | 6/2004 | Rajagopalan et al. |
| 6,899,642 B2 | 5/2005 | Morgan et al. |
| 2001/0018375 A1 | 8/2001 | Hayashi et al. |
| 2001/0019971 A1 | 9/2001 | Hayashi et al. |
| 2002/0013421 A1 | 1/2002 | Takesue et al. |
| 2002/0037968 A1 | 3/2002 | Chen |
| 2002/0055400 A1 | 5/2002 | Higuchi et al. |
| 2002/0061793 A1 | 5/2002 | Higuchi et al. |
| 2002/0091188 A1 | 7/2002 | Statz et al. |
| 2002/0098915 A1 | 7/2002 | Cavallaro |
| 2002/0099120 A1 | 7/2002 | Takesue et al. |
| 2002/0111407 A1 | 8/2002 | Takesue et al. |
| 2002/0177492 A1 | 11/2002 | Watanabe et al. |
| 2005/0049367 A1 | 3/2005 | Rajagopalan et al. |

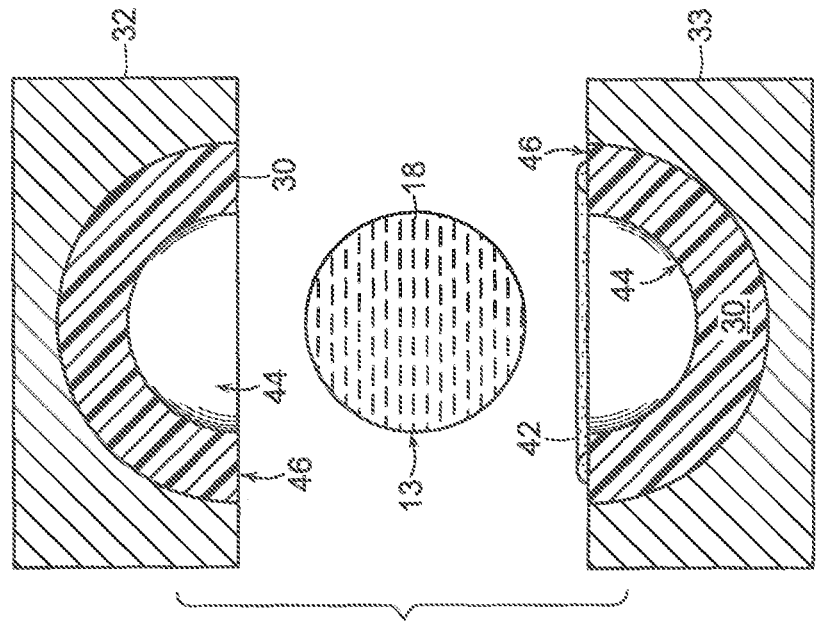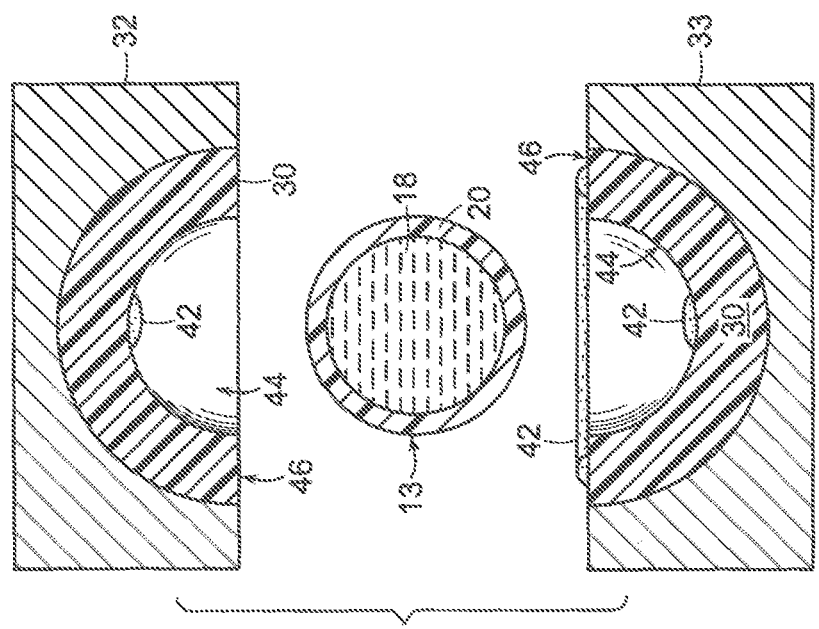

MULTILAYER GOLF BALL

CROSS REFERENCE TO RELATED APPLICATIONS

This application is a continuation of co-pending U.S. patent application Ser. No. 13/904,078, filed May 29, 2013, which is a divisional of U.S. patent application Ser. No. 12/492,226, filed Jun. 26, 2009, which is a continuation-in-part of U.S. patent application Ser. No. 12/275,615, filed Nov. 21, 2008, now U.S. Pat. No. 7,591,742, which is a continuation of U.S. patent application Ser. No. 11/353,563, filed Feb. 14, 2006, now U.S. Pat. No. 7,458,904, which is a continuation-in-part of U.S. patent application Ser. No. 10/670,514, filed on Sep. 26, 2003, now U.S. Pat. No. 7,041,007. These applications are hereby incorporated herein by reference in their entireties.

FIELD OF THE INVENTION

The present invention is directed to a multilayered golf ball having a plurality of core parts bound to each other by an adhesive or other means, and a cover. Particularly, the present invention encompasses golf balls having an inner core center comprised of a gaseous, fluid or solid mass and a non-wound outer core or mantle surrounding the center.

BACKGROUND OF THE INVENTION

Golf balls are typically categorized into two groups: Solid and wound. Solid golf balls commonly include a core encased by a cover. The core may be either single layered or have multiple layers. The cover may also be single or multi-layered. Sometimes, an intermediate layer is disposed between the core and the cover. On the other hand, wound golf balls are generally constructed from a liquid or solid center encased by tensioned elastomeric material and a cover.

Golf ball manufacturers seek to maximize golf player performance under varying weather-related or topographical conditions and in view of individual playing styles. Meanwhile, golf ball specifications set by the USGA (United States Golf Association) are often considered. The USGA requires an overall golf ball diameter of at least 1.68 inches (42.67 mm), an initial velocity of up to 250 ft/sec.+2%, golf ball weight of up to 1.620 ounces, and distance of up to 280 yards, +6%.

The prior art is comprised of various golf balls that have been designed to provide optimal playing characteristics. These characteristics are generally the initial velocity and spin of the golf ball, which can be optimized for various players. For instance, certain players prefer to play a ball that has a high spin rate for playability. Other players prefer to play a ball that has a low spin rate to maximize distance. However, these balls tend to be hard feeling and difficult to control around the greens.

The prior art is comprised of liquid filled golf balls. Wound golf balls have been made with liquid filled centers for many years. Both U.S. Pat. Nos. 1,568,513 and 1,904,012 are directed to wound golf balls with liquid filled centers. U.S. Pat. Nos. 5,150,906 and 5,480,155, are directed to a hollow spherical shell of a polymeric material which is filled with a liquid or unitary, non-cellular material that is a liquid when introduced into the shell. The shell is disclosed as being the outer cover or an inner layer with the outer cover formed to the external surface thereof. The shell varies in thickness from about 0.060 to 0.410 inches in thickness.

Other known attempts to mold layers around a solid center entail placing a preformed center between two blocks of core material in a spherical compression mold, and closing the mold. This is done in the manufacture of golf balls sold by Kamatari. This process, however, provides little control over the ultimate placement of the center within the golf ball core. Large variations in center eccentricities can result.

The prior art also provides for the manufacture of double cover golf balls. This is generally accomplished by injection molding a first and then a second cover layer around a core. This system, however, requires complex injection molds, usually with retractable pins within the mold to properly position the core.

Very small core centers would be desirable to achieve the commonly varying characteristics, including resilience, compression, flexural and/or inertial properties. Previous uses of small diameters were either limited to wound constructions or troubled with very poor concentricity. Additionally, the use of very small centers was not previously possible because the stresses exerted by the subsequent molding processes either distorted or totally displaced the center.

It is also desirable to improve adhesion between outer core parts which mate around the inner core center and improve golf ball durability by eliminating the large fracture plane which presently exists with conventional planar mating surfaces. Accordingly, there is a need for a golf ball and a method of making the golf ball which permits reliable and cost effective use of very small core centers with outer core mating parts meanwhile improving desired golf ball properties and characteristics.

SUMMARY OF THE INVENTION

The present invention relates to a golf ball comprising a multi-layered core and a cover, the multi-layered core comprising an inner core having a diameter of about 0.5 inches or lower and an outer core comprising a plurality of outer core parts that are mated about the inner core. The inner core may comprise a fluid such as a gas, liquid, gel or paste. Alternatively, the inner core may comprise a solid mass. The outer core may comprise, for example, an elastomeric material. Each outer core part comprises an inner surface, an outer surface and at least one nonplanar mating surface, the inner surface being substantially concentrically disposed within the outer surface and comprising a cavity for receiving the inner core. The at least one nonplanar mating surface extends radially between the inner surface and the outer surface and comprises a plurality of mating ridges which extend from the inner surface to the outer surface. For example, in one embodiment, the mating ridges are perpendicular to the inner and outer surfaces. In another embodiment, the ridges extend diagonally between the inner and outer surfaces, although the present invention is not limited to these ridge patterns.

The plurality of outer core parts are mated at each nonplanar mating surface about the inner core and have meshed mating ridges and a nonplanar parting line which extends circumferentially about the outer surface and intersects with the mating ridges on the outer surface. The parting line has a mated strength that is equal to or greater than the cohesive strength of the elastomeric material. The plurality of outer core parts may comprise mating surfaces which are entirely nonplanar, or alternatively which comprise both nonplanar and planar mating surfaces.

The present invention also relates to a method of making the golf ball of the present invention. The method comprises forming an inner core having a diameter of up to about 0.5 inches; forming an outer core comprising the plurality of outer core parts comprising an inner surface, an outer surface and at least one nonplanar mating surface; and mating the outer core parts about the inner core and joining the nonplanar mating surfaces by meshing the mating ridges to form a multi-layer core having a nonplanar parting line which extends about the outer surface circumferentially and intersects the mating ridges at the outer surface. The method of the present invention further comprises molding a cover about the inner core, wherein the elastomeric material has a cohesive strength and the parting line has a mated strength equal to or greater than the cohesive strength.

The inner core may be solid. The solid inner core may be spherical or nearly spherical. Alternatively, the inner core may be oval, polygonal or geodesic. The inner core may even be an open-sided or veined structure. A solid inner core with surface depressions or through-bored diameters are also contemplated. The inner core may be single layered or even multi-layered. In one embodiment, the inner core comprises rubber, plastics, metals, ceramics, glass, or combinations thereof. In another embodiment, the inner core comprises a polymer material selected from the group comprising a thermoset rubber, plastic and thermoplastic elastomeric material and the outer core comprises a polymer material selected from the group comprising a thermoset rubber material and thermoplastic elastomeric material. In one embodiment, the melting or flow points of the inner core material is higher than that which the inner core will encounter during subsequent ball making operations like mating the outer core parts, etc.

In another embodiment, the inner core center is hollow or a fluid mass comprising a gas, liquid, gel, paste or a combination thereof. In one embodiment, the fluid mass is a liquid having a low coefficient of thermal expansion or high boiling point selected from the group comprising an oil, a polyol and mixtures thereof. In yet another embodiment, the fluid mass is a gas, wherein the gas is selected from the group consisting of air, nitrogen, helium, argon, neon, carbon dioxide, nitrous oxide and mixtures thereof.

An outer core as used herein refers to a portion of the golf ball that occupies a volume between the cover and the inner core. The term outer core is used herein interchangeably with the terms mantle layer inner layer or intermediate layer. The outer core may be distinguished from a cover or an inner core by some difference between the golf ball layers, e.g., hardness, compression, thickness, and the like. Accordingly, an outer core is also sometimes referred to in the art as an inner cover layer or an intermediate layer, i.e., any layer(s) disposed between the inner core and the outer cover of a golf ball. This layer may be incorporated, for example, with a single layer or a multilayer cover, with a one-piece inner core or a multilayer inner core, with both a single layer cover and core, or with both a multilayer cover and a multilayer core. As with the inner core, the outer core or mantle layer may also include a plurality of layers. It will be appreciated that any number or type of outer core or mantle layers may be used, as desired.

The term "inner core" as used herein refers to a single layer or multi-layered inner core received within the cavities of the plurality of outer core parts which are mated and comprise the outer core.

As used herein, the term "outer core" refers to a portion of the golf ball that occupies a volume between the cover and the inner core. The term outer core is used interchangeably herein with the terms "mantle layer", "inner layer" or "intermediate layer". The outer core may be distinguished from a cover or an inner core by some difference between the golf ball layers, e.g., hardness, compression, thickness, and the like. Accordingly, an outer core as used herein is also sometimes referred to in the art as an inner cover layer or an intermediate layer, i.e., any layer(s) disposed between the inner core and the outer cover of a golf ball. This layer may be incorporated, for example, with a single layer or a multilayer cover, with a one-piece inner core or a multilayer inner core, with both a single layer cover and core, or with both a multilayer cover and a multilayer core. As with the inner core, the outer core or mantle layer may also include a plurality of layers. It will be appreciated that any number or type of inner core, outer core or cover layers may be used, as desired in accordance with the present invention.

The outer core may comprise, for example, dynamically vulcanized thermoplastic elastomer, functionalized styrene-butadiene elastomer, thermoplastic polyurethane, thermoplastic polyetherester or polyetheramide, thermoplastic ionomer resin, thermoplastic polyester, metallocene polymer or blends thereof. The cover may comprise, for example, an inner cover layer and a thin outer cover layer, wherein the outer cover layer comprises a thermoset material formed from a castable, reactive liquid and the inner cover layer comprises a high flexural modulus material.

In yet another embodiment, the inner core, outer core or even a second outer core (second mantle layer) comprises a polymer containing an acid group that is neutralized by an organic acid or a salt thereof, the organic acid or salt thereof being present in an amount sufficient to neutralize the polymer by at least about 70%. In a preferred embodiment, the polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof. In another preferred embodiment, the organic acid is selected from the group consisting of aliphatic organic acids, aromatic organic acids, saturated mono-functional organic acids, unsaturated mono-functional organic acids, and multi-unsaturated mono-functional organic acids. In yet another preferred embodiment, the salt of organic acids comprise barium, lithium, sodium, zinc, bismuth, chromium, cobalt, copper, potassium, strontium, titanium, tungsten, magnesium, cesium, iron, nickel, silver, aluminum, tin, and calcium salts of stearic acid, behenic acid, erucic acid, oleic acid, linoleic acid, dimerized derivatives, and mixtures thereof.

In one embodiment, the outer diameter of the cover is from about 1.68 inches to about 1.7 inches, the diameter of the inner core is from about 0.0 inches to about 0.5 inches, and the diameter of the outer core is from about 1.45 inches to about 1.66 inches. The thickness of each outer core part, from inner surface to the outer surface, is from about 0.45 inches to about 0.7 inches, and the thickness of the cover, from inner surface to outer surface, is from about 0.01 inches to about 0.1 inches. The outer core may comprise outer core parts which have either identically contoured outer surfaces or differently contoured outer surfaces.

In another embodiment, the outer diameter of the cover of the resulting golf ball is from about 1.68 inches to about 1.684 inches, the diameter of the inner core is from about 0.125 inches to about 0.5 inches, the diameter of the outer core is from about 1.5 inches to about 1.6 inches, the thickness of each outer core part from the inner surface to the outer surface is from about 0.5 inches to about 0.65 inches, and the thickness of the cover, from inner surface to outer surface is from about 0.01 inches to about 0.1 inches.

In yet another embodiment, the resulting golf ball cover outer diameter is from about 1.68 inches to about 1.684 inches, the diameter of the inner core is from about 0.25 inches to about 0.5 inches, the diameter of the outer core is from about 1.53 inches to about 1.6 to inches. The thickness of each outer core part from the inner surface to the outer surface is from about 0.5 inches to about 0.55 inches, and the cover has a width from inner surface to outer surface of from about 0.02 inches to about 0.05 inches.

The plurality of outer core parts may comprise dynamically vulcanized thermoplastic elastomer, functionalized styrene-butadiene elastomer, thermoplastic polyurethane, thermoplastic polyetherester or polyetheramide, thermoplastic ionomer resin, thermoplastic polyester, metallocene polymer or blends thereof. The outer core part and any subsequent outer core layers may further comprise a halogenated thiophenol. Preferably, the halogenated thiophenol is zinc pentachlorothiophenol.

The cover may comprise an inner cover layer and a thin outer cover layer, wherein the outer cover layer comprises a thermoset material formed from a castable, reactive liquid and the inner cover layer comprises a high flexural modulus material. In yet another embodiment, the cover comprises polyether polyester thermoplastic urethane, thermoset polyurethane, polyurea, or polyurethane/polyurea hybrid that is formed from an isocyanate prepolymer. Preferably, the isocyanate prepolymer is paraphenylene diisocyanate.

The mating ridges may have a height, depth or amplitude, pitch, elevation and/or depression of from about 0.001 inches to about 0.05 inches and may have either a uniform height or amplitude or alternatively, may have differing heights or amplitudes. Additionally, the mating ridges may comprise the same material as the entire outer core or alternatively, may comprise a material that is different from the rest of the outer core. Additionally, the ridges may assume a variety of different shapes including but not limited to a sinusoidal shape, a cone shape, a triangular shape, a square shape, or any other alternative shape as long as the entire ridge extends on the mating surface radially from the inner surface of the outer core to the outer surface and the ridges of each outer core part join and mesh to form a resulting outer core.

Golf ball compression remains an important factor to consider in maximizing playing performance. It affects the ball's spin rate off the driver as well as the feel. Initially, compression was referred to as the tightness of the windings around a golf ball. Today, compression refers to how much a ball will deform under a compressive force when a driver hits the ball. A ball actually tends to flatten out when a driver meets the ball; it deforms out of its round shape and then returns to its round shape, all in a second or two. Compression ratings of from about 70 to about 120 are common. The lower the compression rating, the more the ball will compress or deform upon impact.

People with a slower swing or slower club head speed will desire a ball having a lower compression rating. While the compression of a ball alone does not determine whether a ball flies farther—the club head speed actually determines that—compression can nevertheless influence or contribute to overall distance. For example, a golfer with a slower club head speed who uses a high compression ball will indeed lose yardage that would otherwise be achieved if that golfer used a low compression (or softer) ball. Accordingly, it is desirable to match golf ball compression rating with a player's swing speed in maximizing a golfer's performance on the green.

Several different methods can be used to measure compression, including Atti compression, Riehle compression, load/deflection measurements at a variety of fixed loads and offsets, and effective modulus. See, e.g., *Compression by Any Other Name, Science and Golf IV, Proceedings of the World Scientific Congress of Golf* (Eric Thain ed., Routledge, 2002) ("J. Dalton") The term compression, as used herein, refers to Atti compression and is measured using an Atti compression test device. A piston compresses a ball against a spring and the piston remains fixed while deflection of the spring is measured at 1.25 mm (0.05 inches). Where a core has a very low stiffness, the compression measurement will be zero at 1.25 mm. In order to measure the compression of a core using an Atti compression tester, the core must be shimmed to a diameter of 1.680 inches because these testers are designed to measure objects having that diameter. Atti compression units can be converted to Riehle (cores), Riehle (balls), 100 kg deflection, 130-10 kg deflection or effective modulus using the formulas set forth in J. Dalton.

According to one aspect of the present invention, the golf ball is formulated to have a compression of between about 70 and about 120.

The distance that a golf ball would travel upon impact is a function of the coefficient of restitution (COR) and the aerodynamic characteristics of the ball. For golf balls, COR has been approximated as a ratio of the velocity of the golf ball after impact to the velocity of the golf ball prior to impact. The COR varies from 0 to 1.0. A COR value of 1.0 is equivalent to a perfectly elastic collision, that is, all the energy is transferred in the collision. A COR value of 0.0 is equivalent to a perfectly inelastic collision—that is, all of the energy is lost in the collision.

COR, as used herein, is determined by firing a golf ball or golf ball subassembly (e.g., a golf ball core) from an air cannon at two given velocities and calculating the COR at a velocity of 125 ft/s. Ball velocity is calculated as a ball approaches ballistic light screens which are located between the air cannon and a steel plate at a fixed distance. As the ball travels toward the steel plate, each light screen is activated, and the time at each light screen is measured. This provides an incoming transit time period inversely proportional to the ball's incoming velocity. The ball impacts the steel plate and rebounds through the light screens, which again measure the time period required to transit between the light screens. This provides an outgoing transit time period inversely proportional to the ball's outgoing velocity. COR is then calculated as the ratio of the outgoing transit time period to the incoming transit time period, $COR=V_{out}/V_{in}=T_{in}/T_{out}$.

Preferably, a golf ball according to the present invention has a COR of at least about 0.78, more preferably, at least about 0.80.

The spin rate of a golf ball also remains an important golf ball characteristic. High spin rate allows skilled players more flexibility in stopping the ball on the green if they are able to control a high spin ball. On the other hand, recreational players often prefer a low spin ball since they do not have the ability to intentionally control the ball, and lower spin balls tend to drift less off the green.

Golf ball spin is dependent on variables including, for example, distribution of the density or specific gravity within a golf ball. For example, when the density or specific gravity is located in the golf ball center, a lower moment of inertia results which increases spin rate. Alternatively, when the density or specific gravity is concentrated in the outer regions of the golf ball, a higher moment of inertia results with a lower spin rate. The moment of inertia for a one piece ball that is 1.62 ounces and 1.68 inches in diameter is approximately 0.4572 oz-in$^2$, which is the baseline moment of inertia value. The present invention encompasses golf balls having a light center and heavy cover and mantle layers and having a moment of inertia of greater than 0.460 oz-in$^2$. Also contemplated are golf balls having a heavy core (including center and mantle layers) and light cover layer and having a moment of inertia of less than 0.450 oz-in$^2$.

Accordingly, by varying the materials and the shapes of the inner core and outer parts of the present invention, different moments of inertia may be achieved for the golf ball of the present invention.

In one embodiment, the resulting golf ball has a moment of inertia of from about 0.440 to about 0.455 oz-in$^2$. In another embodiment, the golf balls of the present invention have a moment of inertia from about 0.456 to about 0.470 oz-in$^2$. In yet another embodiment, the golf ball has a moment of inertia of from about 0.450 to about 0.460 oz-in$^2$.

The present invention also encompasses a golf ball having a diameter and being comprised of a core and a cover, wherein the core is further comprised of a fluid mass at the center of the ball, a first mantle layer surrounding the fluid mass and a second, solid, non-wound mantle layer surrounding and abutting the first mantle layer, wherein the first mantle layer comprises a polymer material selected from the group consisting of a thermoset rubber, plastic and thermoplastic elastomeric material and the second mantle layer comprises a polymer material selected from the group consisting of a thermoset rubber material and thermoplastic elastomeric material, and wherein the cover comprises material selected from the group consisting of polyether and polyester thermoplastic urethane, thermoset polyurethane, ionomer resins, low modulus ionomers, high modulus ionomers and blends thereof. In one embodiment, the cover comprises a thermoset polyurethane.

In one embodiment, the fluid mass is a liquid having a low coefficient of thermal expansion or high boiling point. In a preferred embodiment, the fluid mass is a liquid having a low coefficient of thermal expansion or high boiling point that is selected from the group consisting of an oil, a polyol and mixtures thereof. In yet another embodiment, the fluid mass is a gas, wherein the gas is selected from the group consisting of air, nitrogen, helium, argon, neon, carbon dioxide, nitrous oxide and mixtures thereof.

In yet another embodiment, the inner core, outer core parts and a second outer core (first mantle layer or second mantle layer) and cover comprise a polymer containing an acid group that is neutralized by an organic acid or a salt thereof, the organic acid or salt thereof being present in an amount sufficient to neutralize the polymer by at least about 70%. In a preferred embodiment, the polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof. In another preferred embodiment, the organic acid is selected from the group consisting of aliphatic organic acids, aromatic organic acids, saturated mono-functional organic acids, unsaturated mono-functional organic acids, and multi-unsaturated mono-functional organic acids. In yet another preferred embodiment, the salt of organic acids comprise barium, lithium, sodium, zinc, bismuth, chromium, cobalt, copper, potassium, strontium, titanium, tungsten, magnesium, cesium, iron, nickel, silver, aluminum, tin, and calcium salts of stearic acid, behenic acid, erucic acid, oleic acid, linoelic acid, dimerized derivatives, and mixtures thereof.

The present invention further encompasses a golf ball having a diameter and being comprised of a core and a cover, wherein the core is further comprised of a fluid mass at the center of the ball, a first mantle layer surrounding the fluid mass and a second, solid, non-wound mantle layer surrounding and abutting the first mantle layer, wherein the first mantle layer comprises a polymer material selected from the group consisting of a thermoset rubber, plastic and thermoplastic elastomeric material and the second mantle layer comprises two or more layers, each made from material that comprises a polymer material selected from the group consisting of a thermoset rubber material and thermoplastic elastomeric material. In a preferred embodiment, the thermoset rubber material is selected from the group consisting of polyisoprene, styrene butadiene, polybutadiene and mixtures thereof. In another preferred embodiment, the thermoplastic elastomeric material is selected from the group consisting of copolymers of methyl-methacrylate with butadiene and styrene, copolymers of methyl-acrylate with butadiene and styrene, acrylonitrile styrene copolymers, polyether-ester, polyether-amide, polyurethane, propylene/ethylene-propylene-diene rubber, styrene-butadiene elastomers, metallocene polymers, polyetheresters, polyetheramides, ionomer resins, polyesters, and blends thereof.

In one embodiment, the fluid mass in the core is a liquid having a low coefficient of thermal expansion or high boiling point. In a preferred embodiment, the fluid mass is a liquid having a low coefficient of thermal expansion or high boiling point that is selected from the group consisting of an oil, a polyol and mixtures thereof. In yet another embodiment, the fluid mass is a gas, wherein the gas is selected from the group consisting of air, nitrogen, helium, argon, neon, carbon dioxide, nitrous oxide and mixtures thereof.

In one embodiment, the outer core or first mantle layer comprises dynamically vulcanized thermoplastic elastomer, functionalized styrene-butadiene elastomer, thermoplastic polyurethane, thermoplastic polyetherester or polyetheramide, thermoplastic ionomer resin, thermoplastic polyester, metallocene polymer or blends thereof. In another embodiment, the cover comprises an inner cover layer and a thin outer cover layer, wherein the outer cover layer comprises a thermoset material formed from a castable, reactive liquid and the inner cover layer comprises a high flexural modulus material.

In yet another embodiment, the inner core, cover, first mantle layer or second mantle layer comprises a polymer containing an acid group that is neutralized by an organic acid or a salt thereof, the organic acid or salt thereof being present in an amount sufficient to neutralize the polymer by at least about 70%. In a preferred embodiment, the polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof. In another preferred embodiment, the organic acid is selected from the group consisting of aliphatic organic acids, aromatic organic acids, saturated mono-functional organic acids, unsaturated mono-functional organic acids, and multi-unsaturated mono-functional organic acids. In yet another preferred embodiment, the salt of organic acids comprise barium, lithium, sodium, zinc, bismuth, chromium, cobalt, copper, potassium, strontium, titanium, tungsten, magnesium, cesium, iron, nickel, silver, aluminum, tin, and calcium salts of stearic acid, behenic acid, erucic acid, oleic acid, linoelic acid, dimerized derivatives, and mixtures thereof.

In another embodiment, a golf ball having a diameter and being comprised of a core and a cover is provided. The core is further comprised of a fluid mass at the center of the ball, and a first, solid, non-wound layer surrounds the fluid mass. The first layer comprises a copolymer or terpolymer of ethylene and an $\alpha,\beta$-unsaturated carboxylic acid, the acid being neutralized at least 80% by a salt of an organic acid, a cation source, or a suitable base of the organic acid. The cover comprises polyurethane, polyurea, or a polyurea/polyurethane hybrid.

According to another embodiment, a golf ball having a diameter and being comprised of a core and a cover is provided. The core is further comprised of a fluid mass at the center of the ball, a shell encompassing the fluid mass, and a first, solid, non-wound mantle layer surrounding the shell. The first mantle layer comprises a copolymer or terpolymer of ethylene and an α,β-unsaturated carboxylic acid, the acid being neutralized at least 80% by a salt of an organic acid, a cation source, or a suitable base of the organic acid. The cover comprises polyurethane, polyurea, or a polyurea/polyurethane hybrid.

In yet another embodiment, a golf ball having a diameter and being comprised of a core and a cover is provided. The core is comprised of a fluid mass at the center of the ball, and a first, solid, non-wound mantle layer surrounding the fluid mass. The first mantle layer comprises a copolymer or terpolymer of ethylene and an α,β-unsaturated carboxylic acid, the acid being neutralized at least 80% by a salt of an organic acid, a cation source, or a suitable base of the organic acid. The cover comprises polyurethane, polyurea, or a polyurea/polyurethane hybrid. The rate of spin decay for the golf ball is at least 10% of an initial spin rate of the golf ball over the entire ball flight.

While the innovative golf balls of the present invention can be manufactured within the golf ball specifications, set by the USGA, the present invention is not restricted to these limits.

Furthermore, while the drawings show a golf ball having two hemispheric outer core layers, the present invention is not limited to this embodiment and the golf ball may also comprise three or more outer core mating parts with nonpalar mating surfaces as well as multiple inner core, outer core and cover layers.

BRIEF DESCRIPTION OF THE DRAWINGS

Further features and advantages of the invention can be ascertained from the following detailed description that is provided in connection with the drawings described below:

FIG. 5 is a sectional view of molds joining cups of a golf ball mantle layer;

FIG. 6 is a sectional view of the mold joining cups of a golf ball mantle layer around an inner sphere of frozen fluid;

DETAILED DESCRIPTION OF THE INVENTION

Further to the discussion above, the golf balls of the present invention encompass any type of ball construction. For example, the golf ball may have at least a three-piece design, a multi-layer core, a multi-layer cover, one or more mantle or intermediate layers. As used herein, the term "multi-layer" means at least two layers. As used herein, the term "layer" includes any generally spherical portion of a golf ball, i.e., a golf ball core or center, mantle layer, and or a golf ball cover. Additionally, the terms outer core, outer core layer and mantle are used herein interchangeably and refer to any outer core or intermediate core layer.

Figure 1:
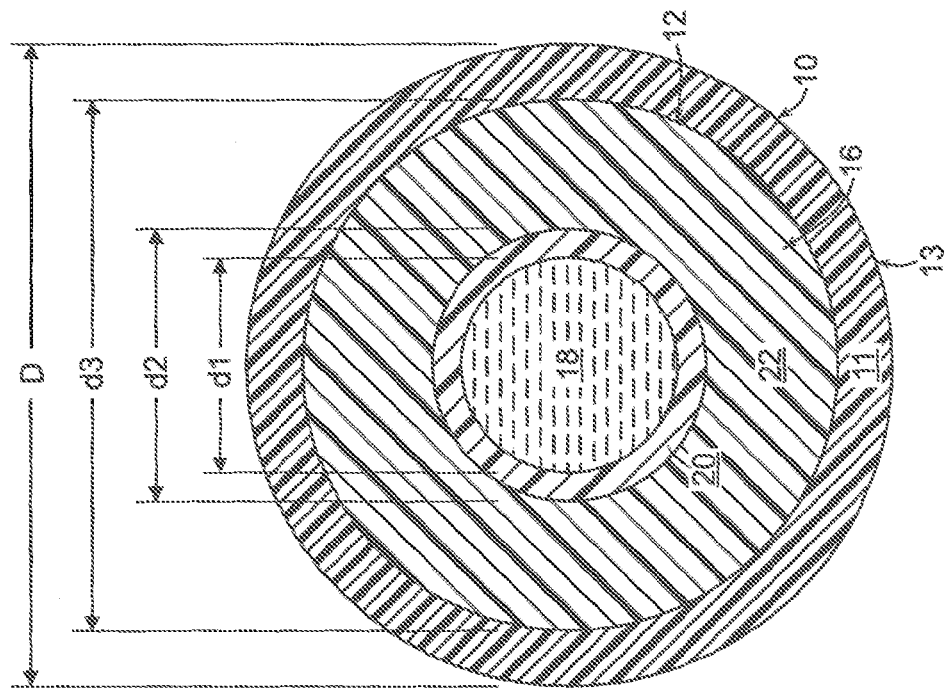
FIG. 1 is a sectional view of a ball of the present invention.

Referring to FIG. 1, ball 10 includes a cover 11 and a core 12. As used herein, the term "core" means the innermost portion of a golf ball, and may include one or more layers. When a multi-layer core is contemplated, the core is the innermost component also called the inner core herein with one or more additional core layers disposed thereon, also termed outer core parts herein. At least a portion of the core, typically the center, referred to herein for example as the inner core, is solid, semi-solid, hollow, powder-filled or fluid-filled. As used herein, the term "fluid" means a gas, liquid, gel, paste, or the like, or a combination thereof. In one embodiment, the core 12 has an inner sphere or inner core 18 that is disposed concentrically therein and which preferably comprises a fluid center in a cavity within a liquid center shell 20.

Figure 2:
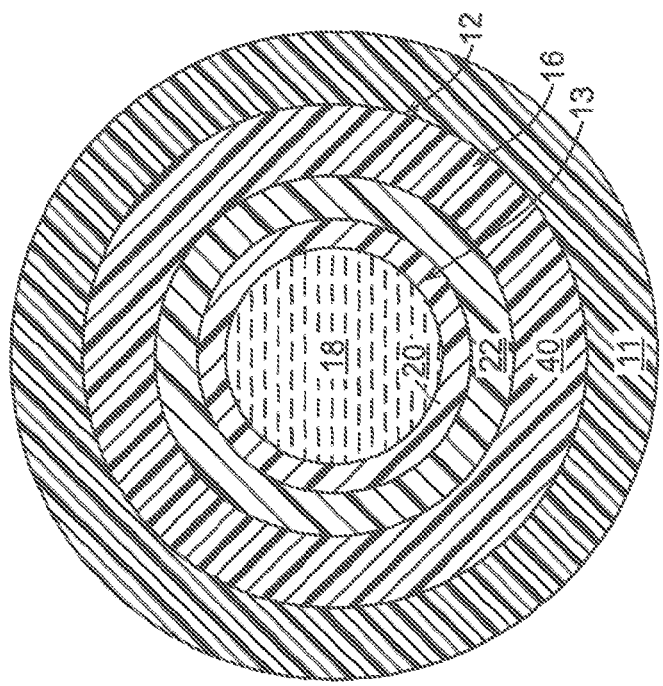
FIG. 2 is a sectional view of a ball according to the present invention with the liquid center shell and multiple mantle and cover layers around an inner sphere.

In one embodiment, the core 12 also has a first mantle layer or outer core part 22, which surrounds the inner sphere or inner core 18 and liquid center shell 20. The mantle portion/outer core part 16 of FIG. 2 has an additional second mantle layer/outer core part 40. The liquid center shell 20 and mantle layers/outer core parts 22 and 40 are preferably elastomers.

The cover 11 provides the interface between the ball 10 and a club and other objects such as trees, cart paths, and grass. Properties that are desirable for the cover are good flowability, high abrasion resistance, high tear strength, high resilience, and good mold release, among others. The golf ball can comprise one cover layer, or two or more cover layers, such as those disclosed in U.S. Pat. No. 5,885,172, the entire disclosure of which is incorporated herein by reference. For example, golf balls having multilayer covers can comprise an inner cover layer and a thin outer cover layer, wherein the outer cover layer comprises a thermoset material formed from a castable, reactive liquid and the inner cover layer comprises a high flexural modulus material. Preferably, the cover 11 is comprised of one or more layers that are injection molded, compression molded, cast or reaction injection molded.

The cover 11 can be comprised of polymeric materials such as ionic copolymers of ethylene and an unsaturated monocarboxylic acid which are available under the trademark "SURLYN®" of E.I. DuPont De Nemours & Company of Wilmington, Del. or "IOTEK®" or "ESCOR®" from Exxon of Houston, Tex. These are copolymers of ethylene and methacrylic acid or acrylic acid partially neutralized with zinc, sodium, lithium, magnesium, potassium, calcium, manganese, nickel or the like.

In accordance with a preferred embodiment of this invention, the cover 11 can be formed from mixtures or blends of zinc, magnesium, calcium, potassium, lithium and/or sodium ionic copolymers. The SURLYN® resins for use in the cover 11 are ionic copolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include acrylic, methacrylic, crotonic, maleic, fumaric or itaconic acid.

The golf balls and components (e.g., cover layers, mantle layers, and/or core layers) encompassed by this invention can likewise be used in conjunction with homopolymeric and copolymeric materials, such as:

(1) Vinyl resins such as those formed by the polymerization of vinyl chloride, or by the copolymerization of vinyl chloride with vinyl acetate, acrylic esters or vinylidene chloride;

(2) Polyolefins such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using single-site catalyst;

(3) Polyurethanes such as those prepared from polyols and diisocyanates or polyisocyanates and those disclosed in U.S. Pat. No. 5,334,673;

(4) Polyureas such as those disclosed in U.S. Pat. No. 5,484,870;

(5) Polyamides such as poly(hexamethylene adipamide) and others prepared from diamines and dibasic acids, as well as those from amino acids such as poly(caprolactam), and blends of polyamides with SURYLN®, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics such as the urethanes, olefinic thermoplastic rubbers such as blends of polyolefins with ethylene-propylene-non-conjugated diene terpolymer, block copolymers of styrene and butadiene, isoprene or ethylene-butylene rubber, or copoly(ether-amide), such as PEBAX® sold by Atofina of Philadelphia, Pa.;

(8) Polyphenylene oxide resins, or blends of polyphenylene oxide with high impact polystyrene as sold under the trademark "NORYL®" by General Electric Company of Pittsfield, Mass.;

(9) Thermoplastic polyesters, such as polyethylene terephthalate, polybutylene terephthalate, polyethylene terephthalate/glycol modified and elastomers sold under the trademarks "HYTREL®" by E.I. DuPont De Nemours & Company of Wilmington, Del. and "LOMOD®" by General Electric Company, Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, etc. and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Additional materials may be included in the compositions of the cover layers, mantle layers, and/or core layers outlined above. For example, reaction enhancers, catalysts, coloring agents, optical brighteners, crosslinking and co-crosslinking agents, whitening agents such as $TiO_2$ and ZnO, UV absorbers, hindered amine light stabilizers, defoaming agents, processing aids, surfactants, and other conventional additives may be added to the compositions. In addition, antioxidants, stabilizers, softening agents, plasticizers, including internal and external plasticizers, impact modifiers, foaming agents, density-adjusting fillers, reinforcing materials, and compatibilizers may also be added to any of the cover and/or mantle layer compositions. One of ordinary skill in the art should be aware of the requisite amount for each type of additive to realize the benefits of that particular additive.

In a preferred embodiment, the cover 11 is comprised of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers and blends thereof. Still further, the cover 11 is preferably comprised of a polyether or polyester thermoplastic urethane, a thermoset polyurethane, a low modulus ionomer such as acid-containing ethylene copolymer ionomers, including E/X/Y copolymers where E is ethylene, X is an acrylate or methacrylate-based softening comonomer present in 0-50 weight percent and Y is acrylic or methacrylic acid present in 5-35 weight percent. More preferably, in a low spin rate embodiment designed for maximum distance, the acrylic or methacrylic acid is present in 15-35 weight percent, making the ionomer a high modulus ionomer. In a high spin embodiment, the acid is present in 10-15 weigh percent or a blend of a low modulus ionomer with a standard ionomer is used.

In another preferred embodiment, the cover 11 is comprised of polyurea or a polyurethane/polyurea hybrid, such as those disclosed in U.S. Pat. No. 6,835,794. The polyurea or a polyurethane/polyurea hybrid may be aliphatic, aromatic or a combination thereof. In a preferred embodiment, the cover 11 is formed from a polyurea composition including at least one light stable or saturated polyurea. Light stability may be accomplished in a variety of ways, such as by utilizing polyurea compositions that include only saturated components, i.e., saturated prepolymers and saturated curing agents, or include a light stabilizer to improve light stability when using aromatic components. The light stable or saturated polyurea includes from about 1 to about 100 weight percent of the cover, with the remainder of the cover, if any, including one or more compatible, resilient polymers such as would be known to one of ordinary skill in the art.

The polyurea compositions may be prepared from at least one isocyanate, at least one polyether amine, and at least one curing agent. Preferably the at least one curing agent is a diol or secondary diamine curing agent.

In another embodiment, the polyether or polyester thermoplastic urethane, thermoset polyurethane, polyurea, or polyurethane/polyurea hybrid is formed from an isocyanate prepolymer (also referred to herein as "isocyanate"). Any isocyanate available to one of ordinary skill in the art is suitable for use according to the invention. Isocyanates for use with the present invention include aliphatic, cycloaliphatic, aralphatic, aromatic, any derivatives thereof, and combinations of these compounds having two or more isocyanate (NCO) groups per molecule. The isocyanates may be organic polyisocyanate-terminated prepolymers, low free isocyanates, and mixtures thereof. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

The compositions of the present invention also encompass polyurethanes formed from a blend of diisocyanate prepolymers, such as those disclosed in U.S. Pat. No. 6,569,034 to Dewanjee et al, the entire disclosure of which is incorporated herein by reference. The compositions of the present invention also encompass polyurethanes formed from paraphenylene diisocyanate-based polyurethane prepolymer, as disclosed in U.S. Pat. No. 6,117,024 to Dewanjee et al, the entire disclosure of which is incorporated herein by reference.

In a preferred embodiment, the isocyanate is a saturated or unsaturated diisocyanate including, for example, diisocyanates having the generic structure: O=C=N—R—N=C=O, where R is a cyclic, aromatic, aliphatic, linear, branched, or substituted hydrocarbon moiety containing from about 1 to 20 carbon atoms, such as arylenes, aralkylenes, alkylenes, or cycloalkylenes. When multiple cyclic or aromatic groups are present, linear, branched, or substituted hydrocarbons containing from about 1 to 10 carbon atoms can be present as spacers between the cyclic or aromatic groups. In some cases, the cyclic or aromatic group(s) may be substituted at the 2-, 3-, and/or 4-positions, respectively. Substituted groups may include, but are not limited to, halogens, cyano groups, amine groups, silyl groups, hydroxyl groups, acid groups, alkoxy groups, primary, secondary, or tertiary hydrocarbon groups, or a mixture thereof.

Examples of saturated (aliphatic) diisocyanates that can be used in the polyurethane prepolymer include, but are not limited to, ethylene diisocyanate; propylene-1,2-diisocyanate; tetramethylene diisocyanate; 1,4-tetramethylene diisocyanate; 1,5-pentamethylene diisocyanate; 2-methyl-1,5-pentamethylene diisocyanate; 1,6-hexamethylene diisocyanate (HDI); HDI biuret prepared from HDI; octamethylene diisocyanate; decamethylene diisocyanate; 2,2,4-trimethylhexamethylene diisocyanate; 2,4,4-trimethylhexamethylene diisocyanate; 1,7-heptamethylene diisocyanate; 1,8-octamethylene diisocyanate; 1,9-novamethylene diisocyanate; 1,10-decamethylene diisocyanate; 1,12-dodecane diisocyanate; 1,3-cyclobutane diisocyanate; 1,2-cyclohexane diisocyanate; 1,3-cyclohexane diisocyanate; 1,4-cyclohexane diisocyanate; methylcyclohexylene diisocyanate (HTDI); 2,4-methylcyclohexane diisocyanate; 2,6-methylcyclohexane diisocyanate; 4,4'-dicyclohexane diisocyanate; 2,4'-dicyclohexane diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); saturated trimerized isocyanurates, such as isocyanurates of hexamethylene diisocyanate, isocyanurates of isophorone diisocyanate, HDI biurets prepared from HDI, isocyanurates of trimethyl-hexamethylene diisocyanate, and mixtures thereof; uretdione of hexamethylene diisocyanate, and mixtures thereof; modified polyisocyanate derived from the above isocyanates and polyisocyanates; and mixtures thereof.

Unsaturated diisocyanates, i.e., aromatic compounds, may also be used with the present invention, although the use of unsaturated compounds in the prepolymer is preferably coupled with the use of a light stabilizer or pigment as discussed below. Examples of unsaturated diisocyanates include, but are not limited to, substituted and isomeric mixtures including 2,2'-, 2,4'-, and 4,4'-diphenylmethane diisocyanate (MDI); 2,2'-, 2,4'-, and 4,4'-biphenylene diisocyanate; 3,3'-dimethyl-4,4'-biphenyl diisocyanate (TODI); 3,3'-dimethyl-4,4'-diphenylmethane diisocyanate; toluene diisocyanate (TDI); polymeric MDI (PMDI, a brown liquid composed of approximately 50% methylene diisocyanate with the remainder comprised of oligomers of MDI); carbodimide-modified liquid 4,4'-diphenylmethane diisocyanate; para-phenylene diisocyanate (PPDI); meta-phenylene diisocyanate (MPDI); ortho-phenylene diisocyanate; 4-chloro-1,3-phenylene diisocyanate; triphenylmethane-4, 4'-, and triphenylmethane-4,4''-triisocyanate; 1,5-naphthalene diisocyanate; 1,5-tetrahydronaphthalene diisocyanate; anthracene diisocyanate; tetracene diisocyanate; dimerized uretdiones of any diisocyanate or polyisocyanate, such as uretdione of toluene diisocyanate, uretdione of diphenylmethane diisocyanate, and mixtures thereof; unsaturated trimerized isocyanurates, such as trimers of diphenylmethane diisocyanate, trimers of tetramethylxylene diisocyanate, isocyanurates of toluene diisocyanate, and mixtures thereof; monomeric triisocyanates such as 2,4,4'-diphenylene triisocyanate, 2,4,4'-diphenylmethane triisocyanate, 4,4',4''-triphenylmethane triisocyanate, and mixtures thereof; and mixtures thereof.

Any polyether amine available to one of ordinary skill in the art is suitable for use according to the invention. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

The polyurea composition can be formed by crosslinking the polyurea prepolymer with a blend or mixture of curing agents. Curing agents for use with the present invention include, but are not limited to, hydroxy terminated curing agents, amine-terminated curing agents, and mixtures thereof. In one preferred embodiment, the curing agents are amine-terminated curing agents, and more preferably secondary diamine curing agents. If desired, however, the polyurea composition may be formed with a single curing agent. Polyurea prepolymers cured with a secondary diamine with 1:1 stoichiometry in the absence of moisture are thermoplastic in nature, while thermoset polyurea compositions, on the other hand, are generally produced from a polyurea prepolymer cured with a primary diamine or polyfunctional glycol.

The use of light stabilizing components also may assist in preventing cover surface fractures due to photodegredation. Suitable UV absorbers and light stabilizers include, but are not limited to, TINUVIN® 292, TINUVIN® 328, TINUVIN® 213, TINUVIN® 765, TINUVIN® 770 and TINUVIN® 622. The preferred UV absorber for aromatic compounds is TINUVIN® 328, and the preferred hindered amine light stabilizer is TINUVIN® 765. A preferred light stabilizer for the saturated (aliphatic) compounds is TINUVIN® 292. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

The compositions of the present invention may be selected from among both castable thermoset and thermoplastic materials, which is determined by the curing agent used to cure the prepolymer. For example, castable thermoplastic compositions of the invention include linear polymers and are typically formed curing the prepolymer with a diol or secondary diamine. Thermoset compositions of the invention, on the other hand, are cross-linked polymers and are typically produced from the reaction of a diisocyanate and a polyol cured with a primary diamine or polyfunctional glycol.

The polyurea compositions preferably include from about 1 percent to about 100 percent polyurea, however, the polyurea compositions may be blended with other materials. In one embodiment, the composition contains about 10 percent to about 90 percent polyurea, preferably from about 10 percent to about 75 percent polyurea, and contains about 90 percent to 10 percent, more preferably from about 90 percent to about 25 percent other polymers and/or other materials as described below.

Other polymeric materials suitable for blending with the compositions of the invention include castable thermoplastic or thermoset polyurethanes, cationic and anionic urethane ionomers and urethane epoxies, polyurethane/polyurea ionomers, epoxy resins, polyethylenes, polyamides and polyesters, polycarbonates, polyacrylin, and mixtures thereof. Examples of suitable urethane ionomers are disclosed in U.S. Pat. No. 5,692,974, the entire disclosure of which is incorporated by reference herein. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870, the entire disclosure of which is incorporated by reference herein. In particular, the polyureas of U.S. Pat. No. 5,484,870 are prepared by reacting a polyisocyanate and a polyamine curing agent to yield polyurea, which are distinct from the polyureas mentioned above, which are formed from a polyurea prepolymer and curing agent. Examples of suitable polyurethanes cured with epoxy group containing curing agents are disclosed in U.S. Pat. No. 5,908,358, the entire disclosure of which is incorporated by reference herein.

Thus in a preferred embodiment, polyurea compositions are blended with polyurethane to form a polyurea/polyurethane hybrid. Polyurethanes suitable for use in the invention are the product of a reaction between at least one polyurethane prepolymer and at least one curing agent. The polyurethanes used in the compositions of the present invention may be selected from among both castable thermoset and thermoplastic polyurethanes. Thermoplastic polyurethanes are linear polymers and are typically formed from the reaction of a diisocyanate and a polyol cured with a diol or a secondary diamine with 1:1 stoichiometry in the absence of moisture. Thermoset polyurethanes, on the other hand, are crosslinked polymers and are typically produced from the reaction of a diisocyanate and a polyol cured with a primary diamine or polyfunctional glycol.

Additionally, suitable cover materials include a nucleated reaction injection molded polyurethane, polyurea or polyurea/polyurethane hybrids, where a gas, typically an inert or non-reactive gas such as nitrogen, argon, helium and air, is essentially vigorously mixed into at least one component of the polyurethane, typically, the pre-polymer, prior to component injection into a closed mold where full reaction takes place resulting in a cured polymer having reduced specific gravity. The materials are referred to as reaction injection molded ("RIM") materials. Examples of RIM materials, as well as the RIM process, are disclosed in U.S. Pat. Nos. 6,548,618, 6,533,566 and 6,290,614, the entire disclosures of which are incorporated herein by reference.

In the mantle portion or outer core portion 16, the liquid center shell 20, and first and second mantle layers 22 and 40 are preferably made of elastomers, such as thermoset rubber, including polyisoprene, styrene butadiene, polybutadiene and combinations thereof; plastic, such as polypropylene; or thermoplastic elastomeric material such as copolymers of methyl-methacrylate with butadiene and styrene, copolymers of methyl-acrylate with butadiene and styrene, acrylonitrile styrene copolymers, polyether-ester, polyether-amide, polyurethane and/or blends thereof. Most preferably, the first and second mantle layers (first and second outer core parts) 22 and 40 are made of thermoset rubber or thermoplastic elastomeric materials.

In another embodiment, highly-neutralized polymers ("HNP's") and blends thereof, such as those described in U.S. patent application Ser. No. 10/118,719, filed Apr. 9, 2002, now U.S. Pat. No. 6,756,436, and U.S. patent application Ser. No. 10/959,751, filed Oct. 6, 2004, now U.S. Publication No. 2005/0049367, the entire disclosures of which are incorporated by reference herein, as well as low melting thermoplastics, may be used in ball cores, mantle layers, and/or covers. HNP's include polymers containing one or more acid groups that are neutralized by an organic acid or a salt thereof. In a preferred embodiment, the first and second mantle layers 22 and 40 are made of such highly-neutralized polymers and/or low melting thermoplastics. In one embodiment, the low melting thermoplastics have a resilience of a thermoset rubber. For example, such low melting thermoplastics having a resilience of a thermoset rubber include, but are not limited to, HNP's and blends of HNP's with compatible thermoplastics, such as partially or fully neutralized ionomers including those neutralized by a metal ion source wherein the metal ion is the salt of an organic acid, polyolefins including polyethylene, polypropylene, polybutylene, and copolymers thereof including polyethylene acrylic acid or methacrylic acid copolymers, or a terpolymer of ethylene, a softening acrylate class ester such as methyl acrylate, n-butyl-acrylate or iso-butyl-acrylate, and a carboxylic acid such as acrylic acid or methacrylic acid (e.g., terpolymers including polyethylene-methacrylic acid-n or iso-butyl acrylate and polyethylene-acrylic acid-methyl acrylate, polyethylene ethyl or methyl acrylate, polyethylene vinyl acetate, polyethylene glycidyl alkyl acrylates.

The acid moieties of the HNP's, typically ethylene-based ionomers, are neutralized greater than about 70%, preferably greater than about 80%, more preferably greater than about 90%, and most preferably at least about 100%. The HNP's can be also be blended with a second polymer component, which, if containing an acid group, may be neutralized in a conventional manner, by the organic fatty acids, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment, the organic acid is selected from the group consisting of aliphatic organic acids, aromatic organic acids, saturated mono-functional organic acids, unsaturated mono-functional organic acids, and multi-unsaturated mono-functional organic acids. Preferably, the salt of organic acids comprise the salts of barium, lithium, sodium, zinc, bismuth, chromium, cobalt, copper, potassium, strontium, titanium, tungsten, magnesium, cesium, iron, nickel, silver, aluminum, tin, calcium, stearic, behenic, erucic, oleic, linoleic, dimerized derivatives, and mixtures thereof.

Additionally, HNP's, such as those described in U.S. application Ser. No. 11/270,066, filed Nov. 9, 2005, the entire disclosure of which is incorporated by reference herein, may be used in the ball cores, mantle layers and/or covers. For example, it has been found that when an acid polymer or a partially neutralized acid polymer is neutralized to 70% or higher using a cation source which is less hydrophilic than magnesium-based cation sources traditionally used to produce HNPs, the resulting inventive HNP provides for compositions having improved moisture vapor transmission properties. For example, a polymer composition comprising an HNP, wherein the HNP is produced using a less hydrophilic cation source, can have a moisture vapor transmission rate of 8 g-mil/100 in$^2$/day or less, or 5 g-mil/100 in$^2$/day or less, or 3 g-mil/100 in$^2$/day or less, or 2 g-mil/100 in$^2$/day or less, or 1 g-mil/100 in$^2$/day or less, or less than 1 g-mil/100 in$^2$/day. As used herein, moisture vapor transmission rate (MVTR) is given in g-mil/100 in$^2$/day, and is measured at 20° C., and according to ASTM F1249-99.

"Less hydrophilic" is used herein to refer to cation sources which are less hydrophilic than conventional magnesium-based cation sources. Examples of suitable less hydrophilic cation sources include, but are not limited to, silicone, silane, and silicate derivatives and complex ligands; metal ions and compounds of rare earth elements; and less hydrophilic metal ions and compounds of alkali metals, alkaline earth metals, and transition metals; and combinations thereof. Particular less hydrophilic cation sources include, but are not limited to, metal ions and compounds of potassium, cesium, calcium, barium, manganese, copper, zinc, tin, and rare earth metals. Potassium-based compounds are a preferred less hydrophilic cation source, and particularly Oxone®, commercially available from E.I. du Pont de Nemours and Company. Oxone® is a monopersulfate compound wherein potassium monopersulfate is the active ingredient present as a component of a triple salt of the formula $2KHSO_5 \cdot KHSO_4 \cdot K_2SO_4$ [potassium hydrogen peroxymonosulfate sulfate (5:3:2:2)]. The amount of less hydrophilic cation source used is readily determined based on the desired level of neutralization.

In one embodiment, the first and second mantle layers (first and second outer core parts) 22 and 40 each independently can include a crosslinker, such as a metal salt of unsaturated carboxylic acid. In particular, the metal salt of unsaturated carboxylic acid is blended as a co-crosslinking agent in at least one of the first and second mantle layers (first and second outer core parts 22 and 40. Examples include magnesium, calcium, zinc, aluminum, sodium, lithium, or nickel salts of unsaturated fatty acids having 3 to 8 carbon atoms, such as acrylic acid, methacrylic acid, maleic acid, and fumaric acid, with the zinc salts of acrylic and methacrylic acid being most preferred. Preferred metal salts of unsaturated fatty acids include zinc acrylate, zinc diacrylate, zinc methacrylate, zinc dimethacrylate, and mixtures thereof. The unsaturated carboxylic acid metal salt may be blended in a rubber either as a preformed metal salt or by introducing an α,β-unsaturated carboxylic acid and a metal oxide or hydroxide into the rubber composition and allowing them to react in the rubber composition to form a metal salt. The unsaturated carboxylic acid metal salt may be blended in any desired amount, but preferably in amounts of about 25 to about 40 parts and more preferably between about 30 to about 35 by weight per 100 parts by weight of the base rubber.

The composition of the first or second mantle layer (first or second outer core parts) 22 or 40 may also contain an organosulfur compound or a metal salt thereof in addition to the base rubber and the unsaturated carboxylic acid metal salt, such as those disclosed in U.S. patent application Ser. No. 09/951,963 (now U.S. Pat. No. 6,635,716), the entirety of which is incorporated herein by reference. The addition of such organosulfur compounds to base rubber compositions exhibit increased COR, decreased compression, or both. The organosulfur compound or metal salt thereof is preferably a halogenated organosulfur compound, and more preferably a halogenated thiophenol, including, but not limited to, pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5, 6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3, 5,6-tetraiodothiophenoland; and their zinc salts. Preferably, the halogenated thiophenol is pentachlorothiophenol ("PCTP"), which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol is the zinc salt of pentachlorothiophenol, which is commercially available from eChinachem of San Francisco, Calif. The organosulfur compounds of the present invention are present in any amount, preferably in an amount greater than about 2 parts or less than 40 parts by weight per 100 parts of base rubber ("pph"). In one embodiment, the organosulfur compound is present between about 2.2 pph and about 30 pph, and preferably between about 2.3 and about 20 pph. In another embodiment, the organosulfur compound is present from about 2.5 pph to about 15 pph, preferably between about 5 pph to about 10 pph. The upper and lower limits of the ranges disclosed herein are interchangeable to form new ranges. For example, the amount of organosulfur compound may be present between about 2.2 pph to about 15, or between about 10 pph and about 40 pph, or between about 2 pph to about 5 pph.

The composition of the first or second mantle layer 20 or 40 (first or second outer core parts) may further contain a co-crosslinking initiator. Preferred examples of the co-crosslinking initiator include organic peroxides, such as dicumyl peroxide, t-butylperoxybenzoate, di-t-butylperoxide, 1,1-bis(t-butylperoxy)-3,3,5 trimethyl-cyclohexane, n-butyl-4,4-bis(t-butylperoxy)valerate, 2,2,-bis(t-butylperoxy-isopropyl) benzene, and 2,5-dimethyl-2,5-di(t-butylperoxy)hexene, with the dicumyl peroxide being most preferred. The initiator may be blended in amounts of about 0.5 to about 3 parts by weight, preferably about 1 to about 2.5 parts by weight per 100 parts by weight of the base rubber.

A composite or metal layer may also be utilized for the first or second mantle layer (first or second outer core parts) 22 or 40 as described in U.S. Pat. No. 6,899,642, the entire disclosure of which is incorporated by reference herein. For example, the composite material may include a filament material embedded in a matrix or binder material.

The filament material may be a single fiber or formed of more than one fiber or a plurality of fibers (i.e., multi-fiber tow or bundle). The filament material may be formed of fibers of polymeric materials, glass materials, or metal fibers, among others. The filament material may also be comprised of strands or fibers having different physical properties to achieve desired stretch and elongation characteristics. The matrix material may be molded about the filament material so that the filament material is embedded in the matrix material, as discussed above. The matrix material may be a thermoset or a thermoplastic polymer. Preferred thermoset polymeric materials are, for example, unsaturated polyester resins, vinyl esters, epoxy resins, phenolic resins, polyurethanes, polyurea, polyimide resins, and polybutadiene resins. Preferred thermoplastics are, for example, polyethylene, polystyrene, polypropylene, thermoplastic polyesters, acrylonitrile butadiene styrene (ABS), acetal, polyamides including semicrystalline polyamide, polycarbonate (PC), shape memory polymers, polyvinyl chloride (PVC), polyurethane, trans-polybutadiene, liquid crystalline polymers, polyether ketone (PEEK), bio(maleimide), and polysulfone resins.

The matrix material can also be a silicone material, such as a silicone polymer, a silicone elastomer, a silicone rubber, silicone resins, or a low molecular weight silicone fluid, thermoplastic silicone urethane copolymers and variations, and the like.

In one embodiment, preferably, the first mantle layer or outer core part 22 is comprised of polybutadiene material that has high specific gravity for a low spin rate ball and a low specific gravity for a high spin rate ball. The specific gravity of the polybutadiene material can be varied by adding fillers known to those skilled in the art.

In another embodiment, the mantle portion or core portion 16 is relatively thick and is comprised of a highly neutralized ionomer or a crosslinked polybutadiene rubber.

A golf ball incorporating these measurements can be designed with the various attributes discussed below, such as specific gravity, resiliency and hardness, to provide the desired playing characteristics, such as spin rate and initial velocity. More particularly, by using a liquid center shell to surround the fluid center, in an inner sphere, and at least a first mantle layer, the specific gravities and other properties can be tailored to provide optimum playing characteristics. More particularly, by constructing a ball according to these dimensions, the first mantle layer or outer core part 22 is made with a significant volume compared to the fluid center 18. Preferably, the volume of the first mantle layer or outer core part 22 is greater than the volume of the fluid center 18. More preferably, the volume of the first mantle layer/outer core part 22 is about 2 to 4 times the volume of the fluid center 18. Thus, the properties of the first mantle layer/outer core part can effect the playing characteristics of the ball.

The hardness and resiliency of the mantle portion 16 can be varied to achieve certain desired parameters such as spin rate, compression and initial velocity. Preferably, the mantle portion/core portion 16 has a hardness of from about 40 Shore C to about 95 Shore C or greater and from about 30 Shore D to about 75 Shore D. Still further, the mantle portion/core portion 16 has a COR from about 0.78 to about 0.85.

In a most preferred embodiment, the liquid center shell 20 is comprised of a plastic material having high temperature resistance, such as those disclosed in U.S. patent application Ser. No. 10/008,013, filed Nov. 13, 2001, now U.S. Pat. No. 6,616,549. In particular, the liquid center shell 20 and/or the first mantle layer 22 comprises dynamically vulcanized thermoplastic elastomer; functionalized styrene-butadiene elastomer; thermoplastic polyurethane; thermoplastic polyetherester or polyetheramide; thermoplastic ionomer resin; fluoropolymers, such as perfluoroalkylenes (e.g., polytetrafluoroethylene, polyhexafluoropropylene), and functionalized fluoropolymer resins that are sulfonated, carboxylated, epoxidized, maleated, amined or hydroxylized as disclosed in U.S. Pat. No. 5,962,140, the entirety of which is incorporated by reference herein; thermoplastic polyester; metallocene polymer or blends thereof and/or thermoset materials.

It will be appreciated that the wall material may be any material known the in art, including thermoplastic-ionomer, polypropylene, polyethylene, acid copolymer, polyolefin, polyurea, metallocene catalyzed polyolefinic copolymers, polyvinyl chloride, polytetra fluoro ethylene, polyester elastomer, polyamide elastomer, polycarbonate, polyester, styrene-butadiene and SEBS block copolymers, silicone or thermoset crosslinked diene rubbers, including butyl rubber, natural rubber, and acrylonitrile.

Suitable dynamically vulcanized thermoplastic elastomers include SANTOPRENE®, SARLINK®, VYRAM®, DYTRON® and VISTAFLEX®. SANTOPRENE® is the trademark for a dynamically vulcanized PP/EPDM (polypropylene/ethylene-propylene-diene rubber). SANTOPRENE® 203-40 is an example of a preferred SANTORPENE® and is commercially available from Advanced Elastomer Systems, Akron, Ohio. Examples of suitable functionalized styrene-butadiene elastomers include KRATON® FG-1901x and KRATON®FG-1921x, which are available from the Shell Corporation. Examples of suitable thermoplastic polyurethanes include ESTANE® 58133, ESTANE® 58134 and ESTANE® 58144, which are commercially available from the B.F. Goodrich Company. Suitable metallocene polymers whose melting points are higher than the cover materials can also be employed in the mantle layer of the present invention. Further, the materials for the mantle layer described above may be in the form of a foamed polymeric material. For example, suitable metallocene polymers include foams of thermoplastic elastomers based on metallocene single-site catalyst-based foams. Such metallocene-based foam resins are commercially available from Sentinel Products of Hyannis, Mass.

Suitable thermoplastic polyetheresters include HYTREL® 3078, HYTREL® 3548, HYTREL® 4078, HYTREL® 4069, HYTREL® 6356, HYTREL® 7246, and HYTREL® 8238 which are commercially available from DuPont, Wilmington, Del. Suitable thermoplastic polyetheramides include PEBAX® 2533, PEBAX® 3533, PEBAX® 4033, PEBAX® 5533, PEBAX® 6333, and PEBAX® 7033 which are available from Atofina, Philadelphia, Pa. Suitable thermoplastic ionomer resins include any number of olefinic based ionomers including SURLYN® and IOTEK®, which are commercially available from DuPont and Exxon, respectively. The flexural moduli for these ionomers are about 1000 psi to about 200,000 psi. Suitable thermoplastic polyesters include polybutylene terephthalate. Likewise, the dynamically vulcanized thermoplastic elastomers, functionalized styrene-butadiene elastomers, thermoplastic polyurethane or metallocene polymers identified above are also useful as the second thermoplastic in such blends. Further, the materials of the second thermoplastic described above may be in the form of a foamed polymeric material.

Preferably, the shell 20 is a thin layer of a polyolefin, ionomer or acid copolymer. Alternatively, the shell 20 may be made of a conventional wound envelope material. In yet another embodiment, the shell 20 material may include a HNP material, as described above. Preferably, this HNP would be selected from those disclosed in U.S. application Ser. No. 11/270,066, filed Nov. 9, 2005, the entire disclosure of which previously was incorporated by reference herein.

The fluid center 18 can be a wide variety of materials or fluids, including solutions and gases, as well as liquids having low coefficient of thermal expansion and/or high boiling points. In particular, the fluid center 18 may be comprised of a gas (and may be pressurized and/or non-reactive), such as air, nitrogen, helium, argon, neon, carbon dioxide, nitrous oxide and mixtures thereof; water; polyols, such as glycerine, ethylene glycol and the like; paste; foams; oils; water solutions, such as salt in water, corn syrup, salt in water and corn syrup, or glycol and water; or mixtures thereof. The fluid can also include pastes, colloidal suspensions, such as clay, barytes, carbon black in water or other liquid, or salt in water/glycol mixtures; gels, such as gelatin gels, hydrogels, water/methyl cellulose gels and gels comprised of copolymer rubber based materials such a styrene-butadiene-styrene rubber and paraffinic and/or naphthenic oil; or melts including waxes and hot melts. Hot-melts are materials which at or about normal room temperatures are solid but at elevated temperatures become liquid. The fluid center 18 can also be a reactive liquid system which combine to form a solid. Examples of suitable reactive liquids are silicate gels, agar gels, peroxide cured polyester resins, two part epoxy resin systems and peroxide cured liquid polybutadiene rubber compositions. It is understood by one skilled in the art that other reactive liquid systems can likewise be utilized depending on the physical properties of the liquid center shell and the physical properties desired in the resulting finished golf balls. U.S. Pat. Nos. 6,200,230, 5,683,312, and 5,150,906 contain disclosures of preferred liquids for use in the shell 20, and their entire disclosures are incorporated by reference herein.

The fluid center 18 can be varied to modify the performance parameters of the ball, such as the moment of inertia. Preferably, the fluid center 18 is comprised of a material that has a high specific gravity for high spin rate golf balls and a material that has a low specific gravity for a low spin rate golf ball. Preferably, the specific gravity of the fluid is below or equal to 1.2 for low specific gravity centers and above 1.2 for high specific gravity centers. Preferably, the specific gravity is approximately 0.90-1.2, more preferably 1.15-1.2 for low specific gravity centers and approximately 1.21-1.70, and more preferably 1.3-1.55 for high specific gravity centers. Still further, the fluid is preferably comprised of a material with a low viscosity for a golf ball having a high spin rate and a material having a high viscosity for a golf ball having a low spin rate. Preferably, the viscosity of the fluid center 18 is less than 100 cps for low viscosity centers and greater than or equal to 100 cps for high viscosity centers. More preferably, the viscosity of the fluid center 18 is less than or equal to 10 cps for low viscosity centers and is between 100 and 1500 cps for high viscosity centers. Most preferably, the fluid center 18 viscosity is approximately 500 cps for high viscosity centers.

The specific gravity of the fluid center 18 can be decreased and the specific gravity of the mantle portion 16 increased for a low spin rate ball. Alternatively, the specific gravity of the fluid center 18 can be increased and the specific gravity of the mantle portion 16 decreased for a high spin rate ball. This is also the case where the inner core is a solid.

Optionally, the core may have an inner surface of the shell 20 that is modified to increase surface area and thereby change the rate of spin decay by altering the decoupling of the liquid from the shell wall at some point following impact, as described in U.S. Pat. No. 6,238,304, the entire disclosure of which is incorporated by reference herein. The modified inner surface allows modification of the fluid dynamic properties in the liquid filled center by a means other than changing the type of fluid filling in the core. More particularly, this includes use of a modified inner surface of the shell. Frictional drag between the shell and fluid is adjusted by modification of the inner surface next to the fluid.

Many techniques may be used to modify the frictional drag of the fluid inside the liquid center shell. A texture may be added to the inner surface of the shell. The texture could be in the form of dimples, nubs, paddles or fingers extending into the center of the core of the golf ball or grooves cut or molded into the inner surface of the shell. Individual textures can themselves be modified by increasing or decreasing their size or depth, or alternating their placement or number. Further, protrusions of varying sizes or shapes could be used on the inner surface of the shell.

Figure 13A:
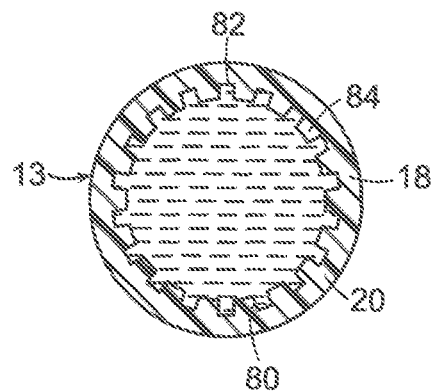
FIGS. 13A-13D are sectional views of the liquid centers of balls according to embodiments of the invention having an inner surface that is modified with an increased surface area.
Figure 13B:
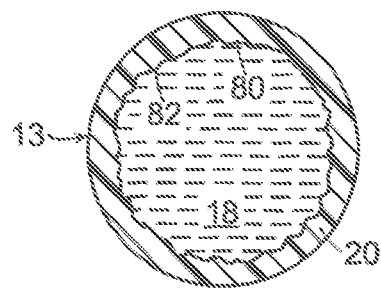
Figure 13C:
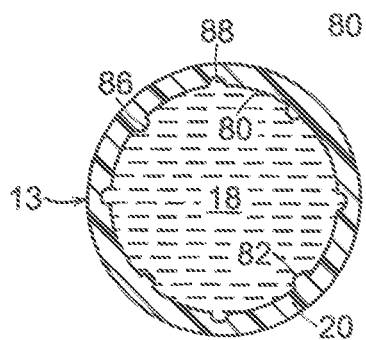
Figure 13D:
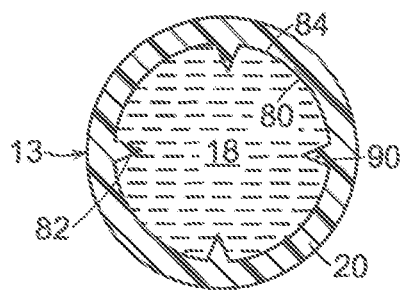

FIGS. 13A-D illustrate examples of shells 20 having modified inner surfaces. The shells 20 have an inner surface 80 with a texture 82 added. For example, in FIG. 13A, protrusions 84 are provided on the inner surface 80 of the shell 20 to increase the surface area. These protrusions 84 are shown being regularly shaped, sized and spaced. It will be appreciated that one or more of the shape, size and spacing of the protrusions may be varied. In FIG. 13B, the inner surface 80 of the shell 20 has been modified to a wavy surface to increase the surface area. The wavy surface may be regular or irregular. FIG. 13C illustrates the inner surface 80 of the shell 20 having both projections 86 and dimples 88 on the inner surface 80 to increase the surface area. Finally, in FIG. 13D, the protrusions 84 are shown to be triangular protrusions that extend from the inner surface 80 of the shell 20. It will be appreciated that numerous variations will be apparent to one of skill in the art.

Additionally, it will be appreciated that although these modified inner surfaces 80 are illustrated on the shell 20, they could be provided on the inner surface of any other layer provided adjacent the fluid center 18.

The modified inner surface of the shell may be used to modify the spin decay during a ball's flight. Preferably, the rate of spin decay is greater than 4% of initial spin, more preferably at least 10% of initial spin, and still more preferably at least 15% of initial spin. The rate of spin decay is preferably the rate of spin decay over the entire ball flight. For example, if a golf ball has an initial spin rate of 3500 rpm, a spin decay of 10% of initial spin will result in a spin rate of 3150 rpm at the end of the ball's flight.

FIGS. 14A-D illustrate the slope of a regression line quantifying the rate of spin decay during the first 0.4 seconds of a ball's flight and compare it to a similar regression quantifying the rate of spin decay for the complete ball flight. Golf ball spin rate decay measurements were taken on shots hit by a skilled human golfer. Measurements were made on two wound, liquid center construction balls (Titleist Tour Balata and Titleist Tour Professional), known in the prior art for their spin decay properties. These constructions are compared to the Titleist ProV1x, a modern solid construction ball known to feature a different spin decay profile than a liquid center ball. Data was acquired by means of a "Trackman", a proprietary phased array radar golf ball tracking device manufactured by ISG Denmark (www.isg.dk). This tracking device has recently been used for in-tournament player data acquisition by the USGA (http://www.usopen.com/2005/news/test_center.html). Among other data, Trackman provides continual real-time measurements of golf ball spin rate throughout the ball's flight. With this information, a golf ball's spin rate can be plotted as a function of flight time and comparative measurements of downrange spin performance can be evaluated.

Figure 14A:
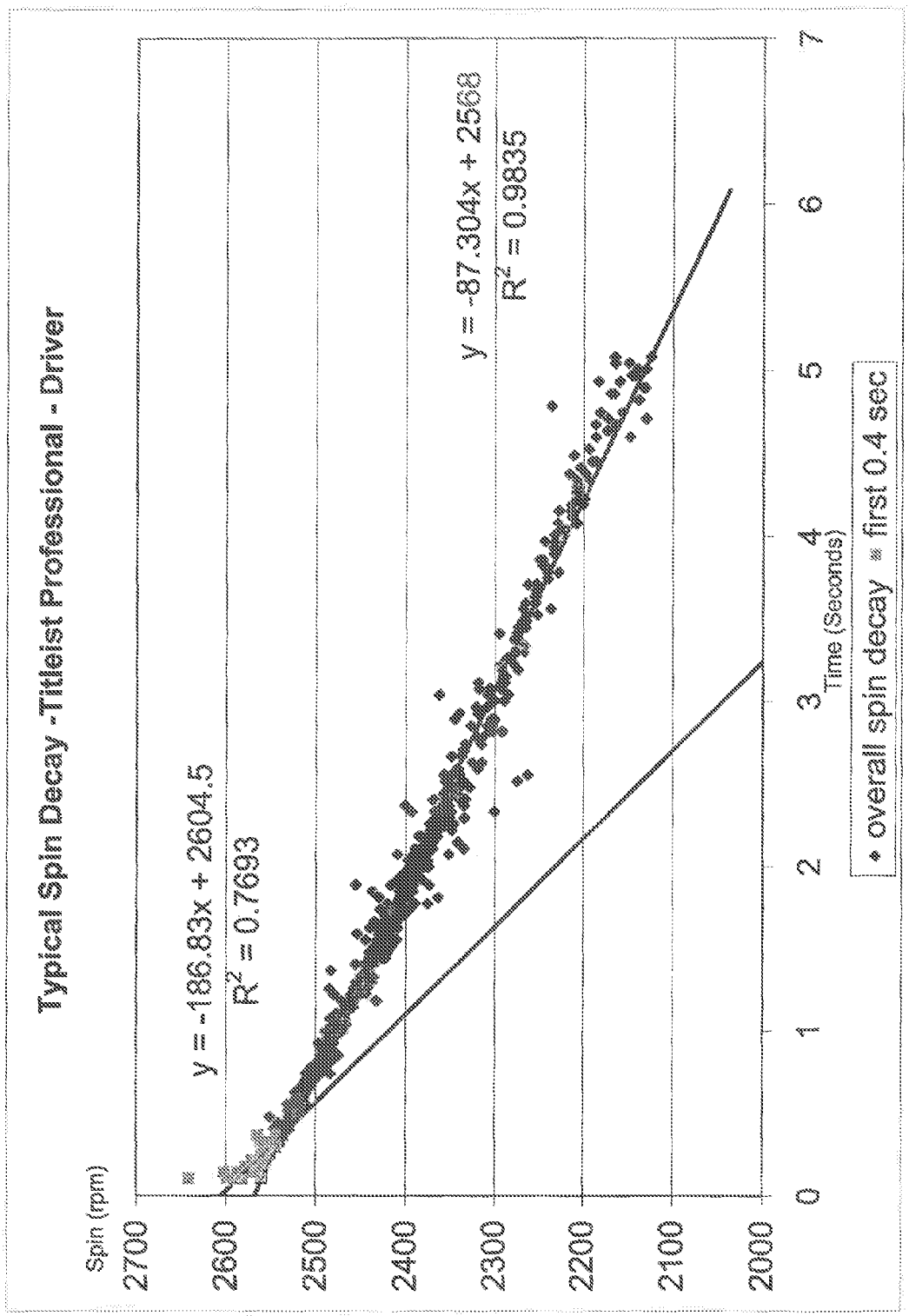
FIGS. 14A-D are graphs depicting spin decay rates for the present invention and prior art golf balls.
Figure 14B:
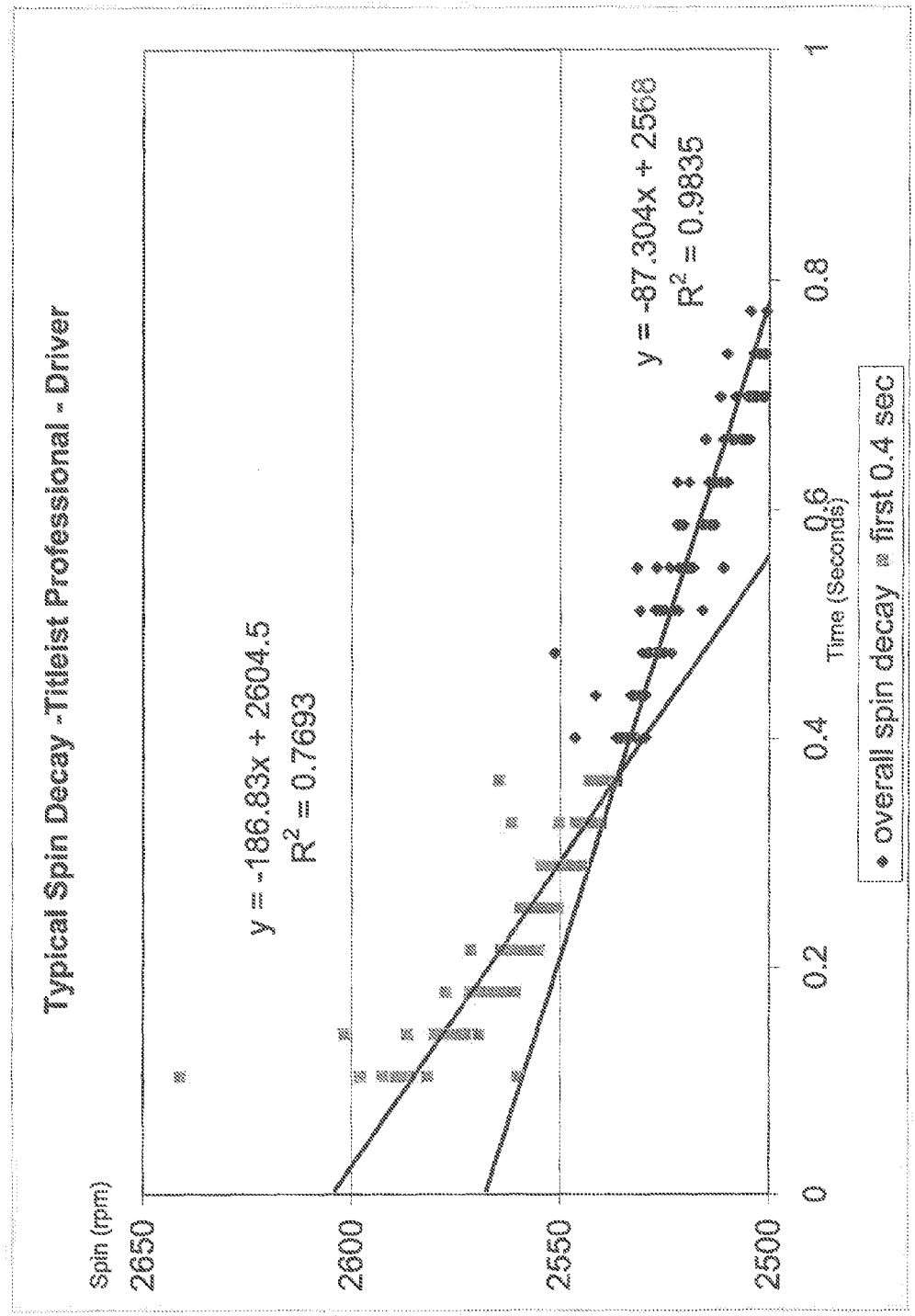

As shown in FIGS. 14A and 14B, the spin decay for a Titleist Professional golf ball hit by a driver is illustrated. As discussed above, the Titleist Professional has a wound construction with a liquid center. This golf ball results in a regression line for the first 0.4 seconds of flight having a slope of −186.83, while for the whole flight the regression line has a slope of −87.304. Thus, the difference in slope for the two regression lines is about 100 units.

Figure 14C:
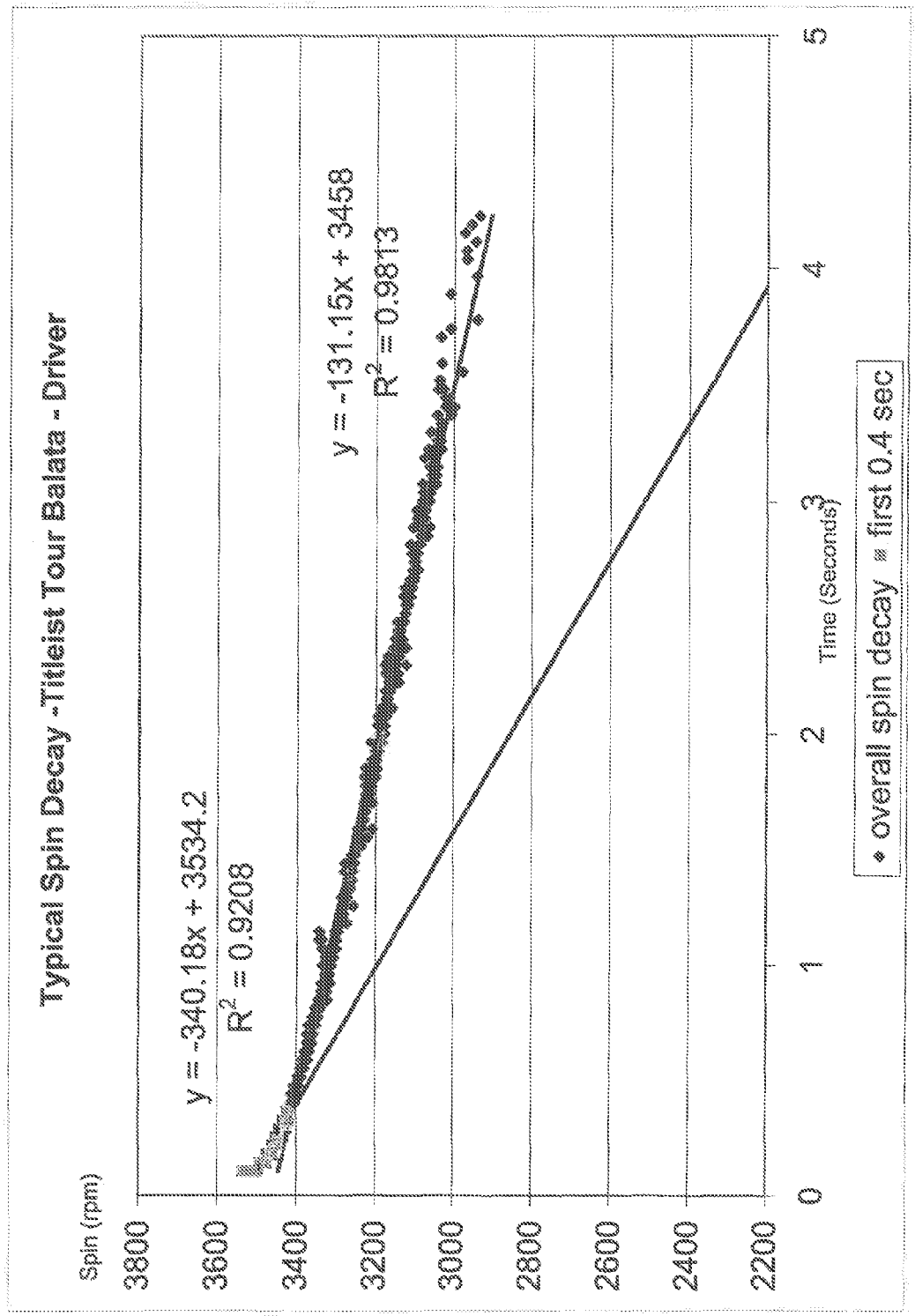

Referring now to FIG. 14C, the spin decay for a Titleist Tour Balata golf ball hit by a driver is illustrated. As discussed above, the Titleist Tour Balata also has a wound construction with a liquid center. This golf ball results in a regression line for the first 0.4 seconds of flight having a slope of −340.18, while the regression line for the whole flight has a slope of about −131.15. Thus, the difference in slope for the two regression lines is about 200 units.

Figure 14D:
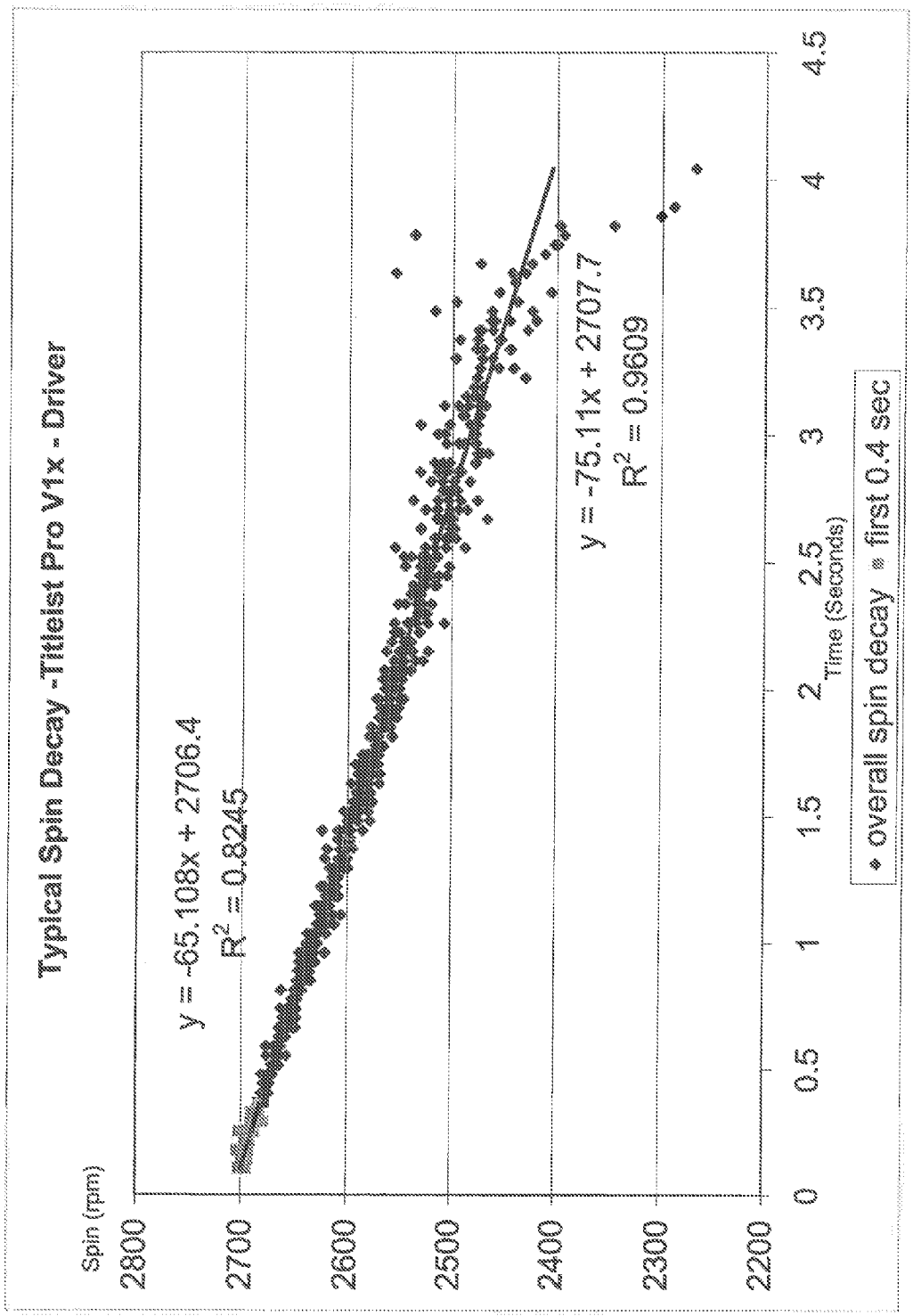

In comparison, FIG. 14D illustrates the spin decay for a current Titleist ProV1x golf ball hit by a driver. As discussed above, the Titleist ProV1x has a non-wound, solid construction. This golf ball results in a regression line for the first 0.4 seconds of flight having a slope of −65.108, while the regression line for the whole flight has a slope of about −75.11. Thus, the difference in slope for the two regression lines is about 10 units.

Preferably, a golf ball made according to the invention will have a rate of spin decay, such that the difference in slopes between the regression lines of the first 0.4 seconds of golf ball flight and the whole golf ball flight will be at least 20 units. More preferably, the difference in slopes will be from about 30 to 250 units. Applicants expect that a golf ball made with a liquid center, having a non-wound mantle portion comprising HNP will result in a spin decay, such that the difference in slope for the two regression lines will be more similar to prior art golf balls having a wound construction with a liquid center than current solid non-wound golf balls, such as the ProV1x.

Dimensions of golf ball components, i.e., thickness and diameter, may vary depending on the desired properties. For the purposes of the invention, any layer thickness may be employed. Non-limiting examples of the various embodiments outlined are provided herein with respect to layer dimensions.

The present invention relates to golf balls of any size. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.900 inches. The more preferred diameter is from about 1.680 inches to about 1.760 inches. A diameter of from about 1.680 inches to about 1.740 inches is most preferred; however, diameters anywhere in the range of from 1.680 to about 1.950 inches can be used. Preferably, the overall diameter of the core and all mantle or intermediate layers is about 80 percent to about 98 percent of the overall diameter of the finished ball.

The inner core of the present invention advantageously has a diameter of 0.5 inches or lower. The sizing, structure and arrangement and mating method for the other golf ball around the small diameter core permit the use of this small diameter without bias and adhesive problems.

The outer core may comprise outer core parts which have either identically contoured outer surfaces or differently contoured outer surfaces.

The inner core of the golf ball may be extremely small in relation to the rest of the ball. For example, in one embodiment, the inner core makes up from about 10% to about 50% of the entire ball diameter. Meanwhile, however, the weight of the inner core with respect to the outer core parts, etc. may vary depending on the desired characteristics for the golf ball such as moment of inertia, COR, etc.

Turning to a method for making the ball of the present invention, in one embodiment, the inner sphere is produced by forming the liquid center shell 20 to create a central cavity, and filling the cavity with the fluid center 18. A first cup is made by compression molding cup material 31, preferably polybutadiene, between a first substantially hemispherical concave mold part 32 and a protrusive mold part 34. The protrusive mold part 34 has a first substantially hemispherical protrusion 35 that faces the first concave mold part 32. A second cup is then made in the same manner.

Figure 4:
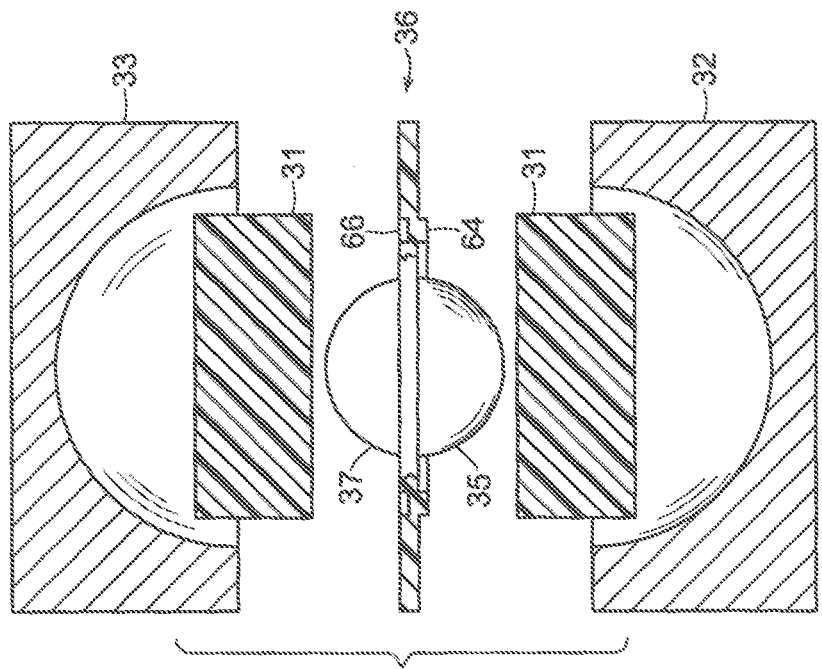
FIG. 4 is a sectional view of molds preforming a mantle layer's cups according to the present invention.
Figure 3:
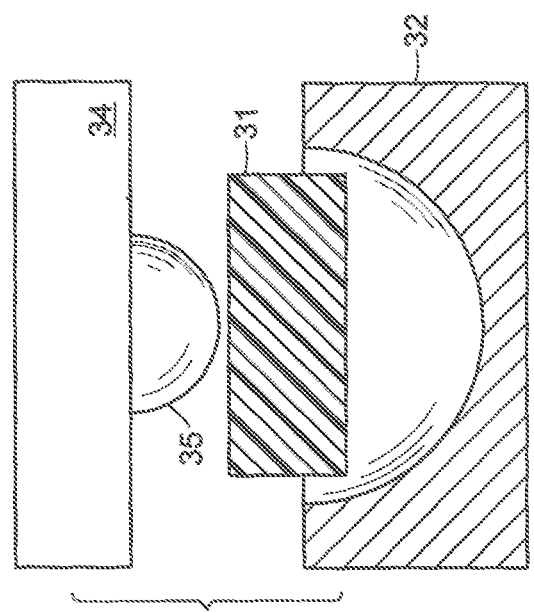
FIG. 3 is a sectional view of a mold preforming a single cup.

Alternatively, as shown in FIG. 4, the two cups 30 are simultaneously compression molded about a single protrusive mold part 36 that has first and second protrusions 35 and 37. First and second hemispherical molds 32 and 33 are positioned opposite each other and protrusive mold part 36 is placed between the hemispherical molds 32 and 33.

FIG. 5 shows two concave mold parts 32 and 33 after cups 30 have been molded. Each hemispherical cup 30 has a hemispherical cavity 44. Disposed around the cavities 44, the cups 30 have mating surfaces 46, which are substantially flat in this embodiment.

At this point in the process, the inner sphere 13 is placed in the cups 30, and the two cups 30 are joined. Cups 30 are preferably kept in their respective hemispherical molds 32 and 33 during this step. The preferred method for joining the cups 30 is to place adhesive 42 between the cups by applying the adhesive to one of the cups 30 as shown in FIG. 5. The cups 30 are then brought together, squeezing the adhesive evenly across the mating surfaces of the cups 30. The adhesive 42 then sets and bonds the cups 30 to one another. The adhesive is also preferably applied such that it bonds the inner sphere 13 to the cups 30 by placing adhesive 42 within the cavities. As with the adhesive 42 placed between cups, the adhesive 42 placed between the cups 30 and the inner sphere 13 is spread evenly upon joining the cups 30 to one another. The hemispherical cavities 44 of the joined cups together form a spherical cavity, occupied by the inner sphere 12.

Another method for joining the cups 30 is to compress them together at an elevated temperature to cause crosslinking between the elastomeric cup material of each cup 30. In the embodiment shown in FIG. 4, this may be achieved by removing protrusive mold part 36, and running the compression mold through a second cycle, heating and compressing the cups 30 together.

FIG. 6 shows the inner sphere 13 and the cups 30 prior to their being joined. In this embodiment, the inner sphere is merely a sphere of frozen fluid 18 that placed between the cups 30, and around which the cups 30 are joined, preferably before the fluid 18 begins to melt.

Figure 8:
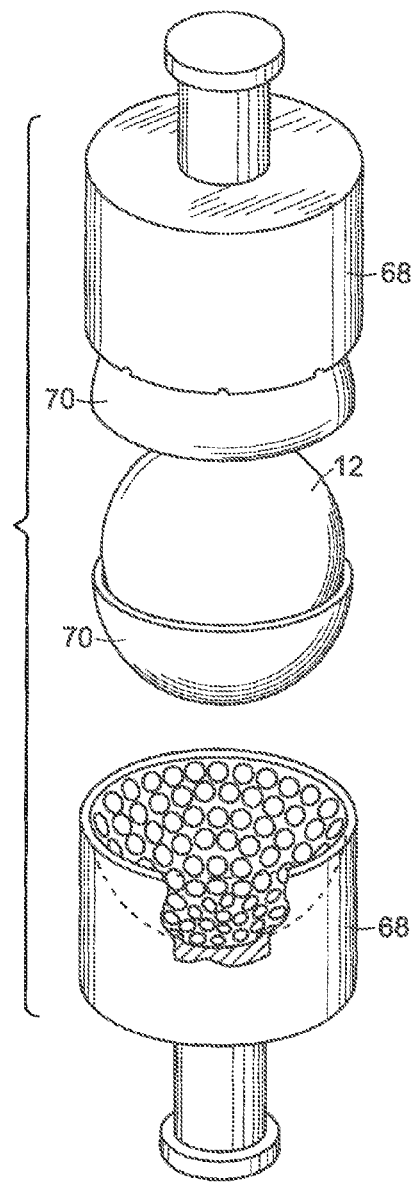
FIG. 8 illustrates a compression mold forming a cover around a golf ball core.
Figure 9:
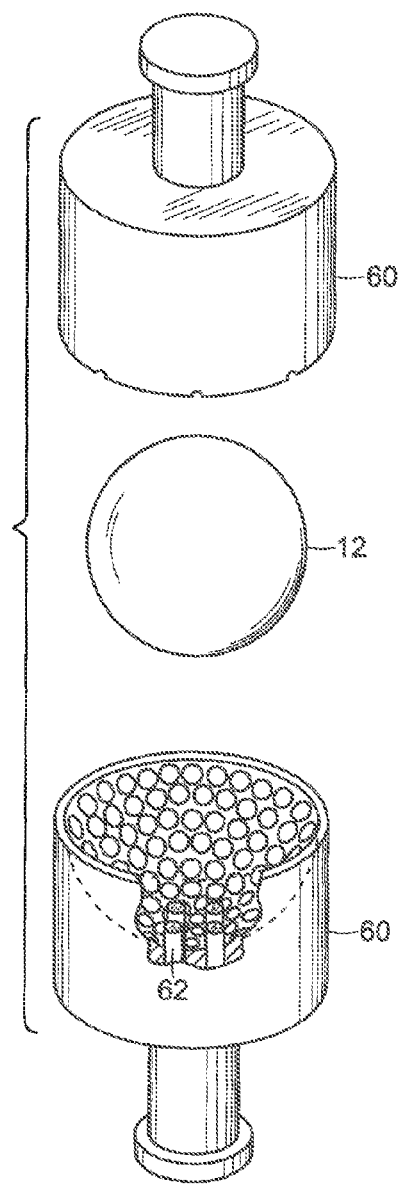
FIG. 9 shows an injection mold forming a cover around a core.

Once the cups 30 are joined, the cover 11 is formed around the core 12, as seen in FIG. 8. FIG. 8 illustrates a step of compression molding two halves 70 of a cover 11 around the core 12 in a dimpled mold 68. FIG. 9 shows a step of injection molding the cover 11 around the core 12 in a dimpled mold 60 with pins 62 that position the core 12 within the dimpled mold 60 and retract before the cover 11 cures completely.

Figure 7:
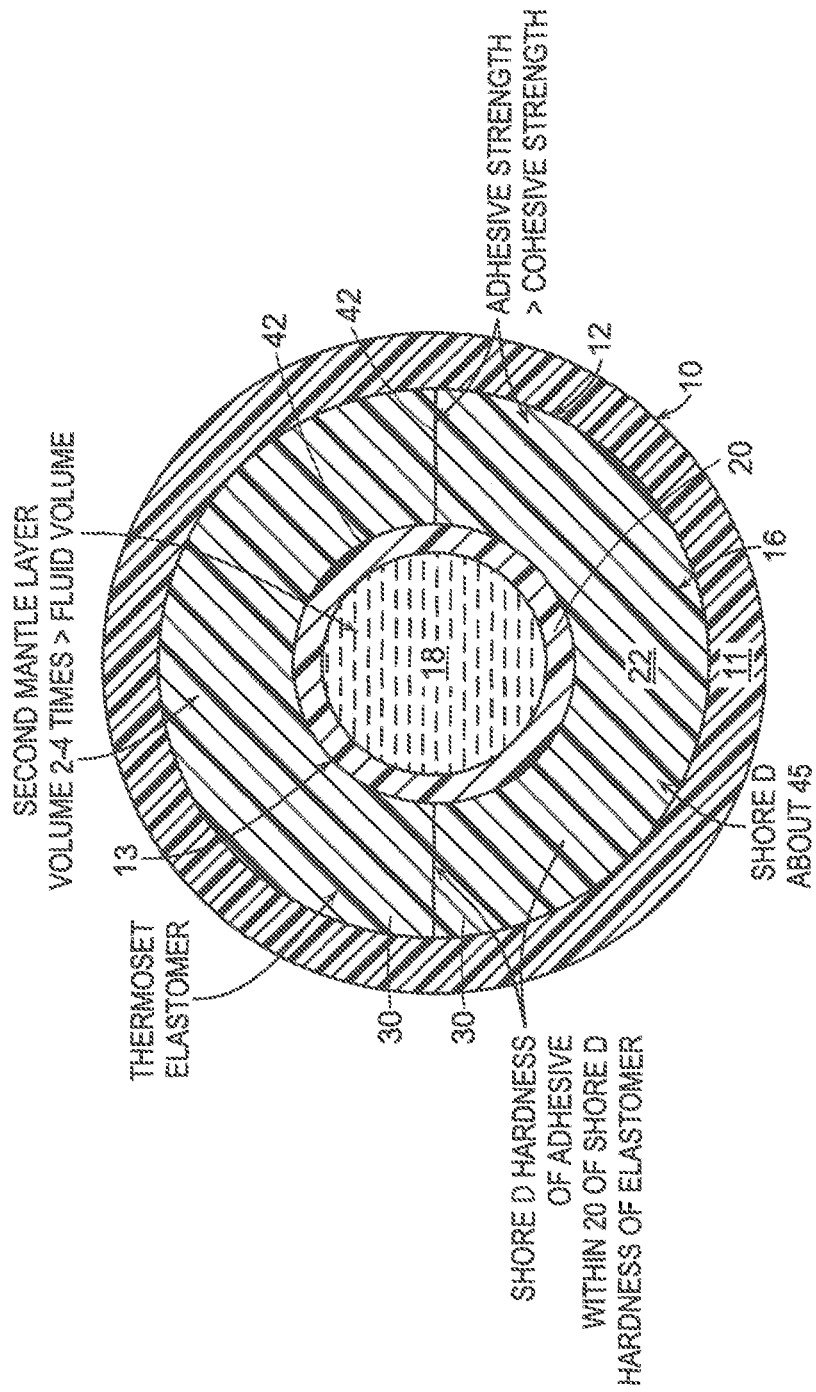
FIG. 7 is a sectional view of a ball according to the invention having adhesive joining the cups.

The golf ball of FIG. 7 has been formed by adhesively joining the cups 30. Adhesive 42 extends between the cups in the first mantle layer 22, and between the each cup 30 and the inner sphere 13. The adhesive 42 preferably has an adhesive strength that is greater than the cohesive strength of the elastomeric cup material. Thus, a ball can be manufactured that is at least as strong as a ball in which the mantle layer is made from a single piece of cup material, because the elastomer forming the cups 30 will fail under a lighter load than the adhesive 42. Ideally, the adhesive 42 is flexible in its cured state and has physical properties similar to those of the cup material employed.

A preferred adhesive for use with polybutadiene cups 30 is an epoxy, formed by blending low viscosity liquid resins, and formulated to be flexible in its cured state. A suitable epoxy is formed by mixing an approximately 1:1 volume ratio of about 83 parts by weight of AB-82 hardener into 100 parts by weight of Epoxy Resin #1028, both of which are sold by RBC Industries, Inc. In its liquid state, the epoxy is ideal for use in metering, mixing, and dispensing equipment. This epoxy is preferably cured at 77° F. for 18 to 24 hours, at 95° F. for 6 hours, at 120° F. for 3 hours, or at 150° F. for 1 hour. The cured adhesive's physical properties resemble those of elastomeric urethane. It exhibits an Izod impact strength of 5.50 ft. lbs./in. of notch, a tensile strength at 25° C. of 2,200 psi, a compressive strength at 25° C. of 6,000 psi, and a shore D hardness of 45. Preferably, the shore D of the cured adhesive is within 20 shore D of the hardness of the elastomeric cup material.

Other preferred adhesives are those adhesives containing cyanoacrylate.

Figure 10B:
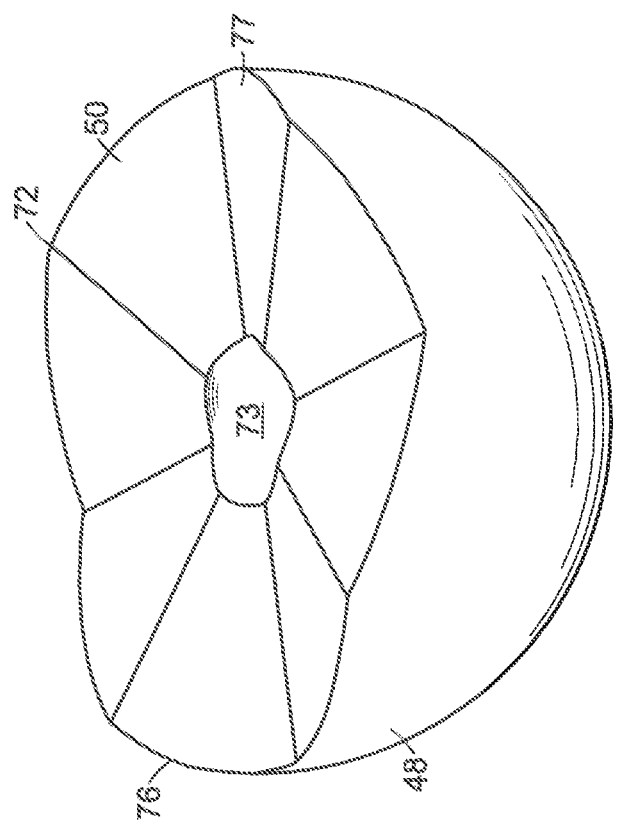
FIGS. 10B is a sectional view of hemispherical cup having nonplanar mating surfaces with ridges which extend from the inner surface to the outer surface perpendicularly.
Figure 10A:
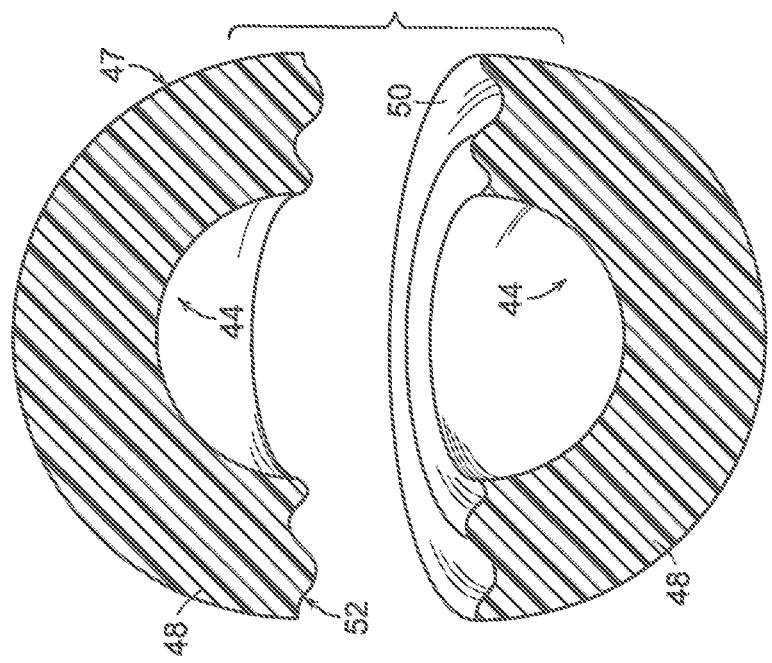
FIGS. 10A and 11 are sectional views of cups with nonplanar mating surfaces that mesh with one another.
Figure 11:
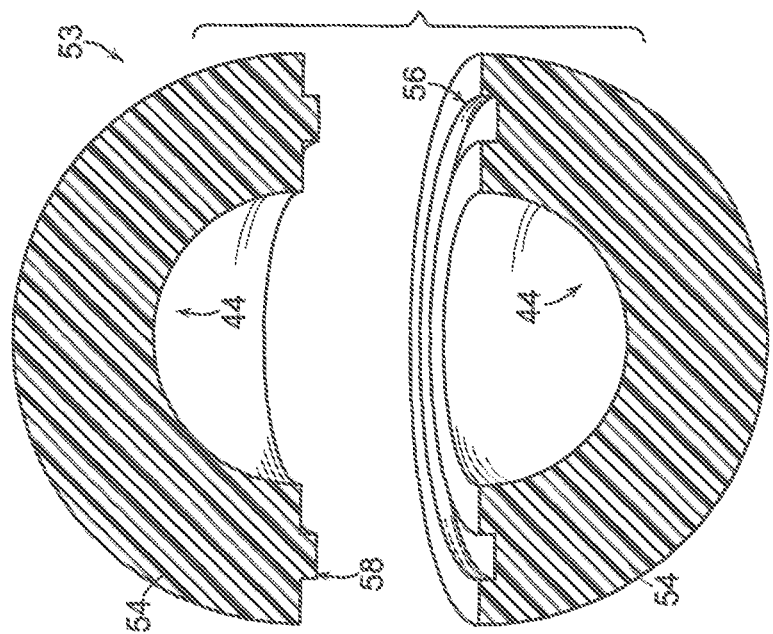
Figure 100:
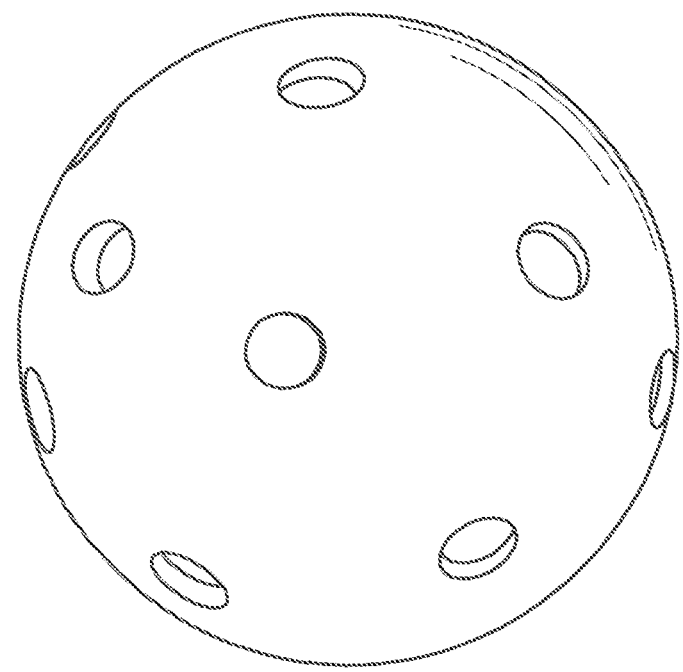
Figure 12:
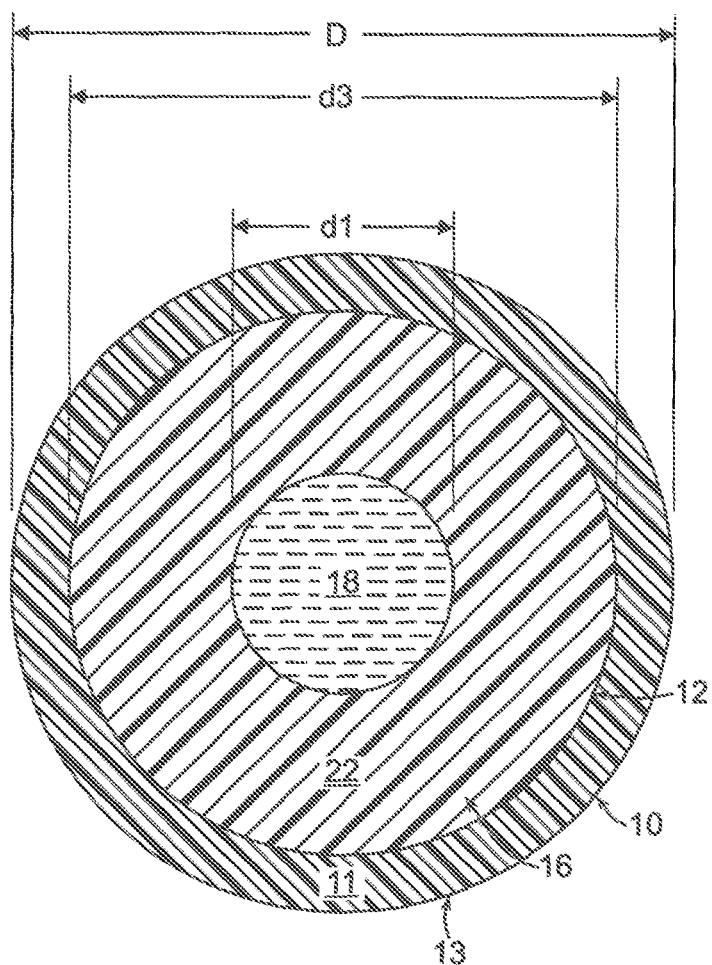
FIG. 12 is a sectional view of a ball according to another embodiment of the invention.

FIGS. 10A and 11 show alternative embodiments of cups 48 and 54. Instead of having flat mating surfaces, cups 48 and 54 have nonplanar mating surfaces 50 and 52, and 56 and 58. These surfaces 50 and 52, and 56 and 58 each have a circular pattern of ridges that is preferably symmetrical about the cavity 44 of each cup 48 and 54; the patterns shown are concentric with the cups 48 and 54. In ball 53, surface 58 has a tongue that engages a groove of surface 56. In the finished golf balls 47 and 53, nonplanar surfaces 50 and 52 are arranged to mesh with each other, as are nonplanar surfaces 56 and 58. These nonplanar mating surfaces 50 and 52 are preferably formed by molding the cups 48 or 54 with protrusive mold parts that have nonplanar surfaces surrounding their protrusions, such as the protrusive mold part 36 with nonplanar surfaces 64 and 66, as shown in FIG. 4.

The inner core shell and mantle layers in the mantle portion 16 of golf balls with nonplanar mating surfaces retain more of the properties of the elastomers that form the cups, when the cups are forced in shear with respect to each other, as compared to a golf ball with flat mating surfaces. Nonplanar mating surfaces are thus advantageous when an adhesive is used that has an adhesive strength lower than the cohesive strength of the elastomeric cup material. This is because the meshed portions of the cups 48 and 54 aid in resisting shearing forces between the two cups 48 and 54.

Figure 10D:
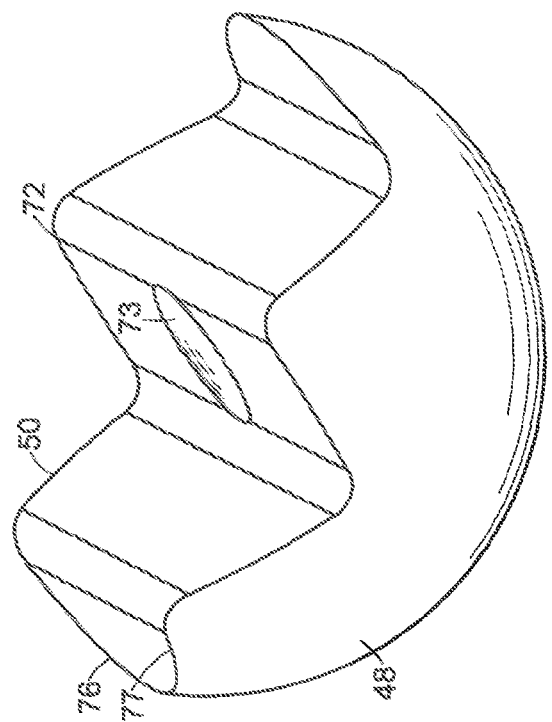
FIG. 10D is a sectional view of hemispherical cups having nonplanar mating surfaces with ridges which extend from the inner surface to the outer surface in a wave-like pattern.
Figure 10C:
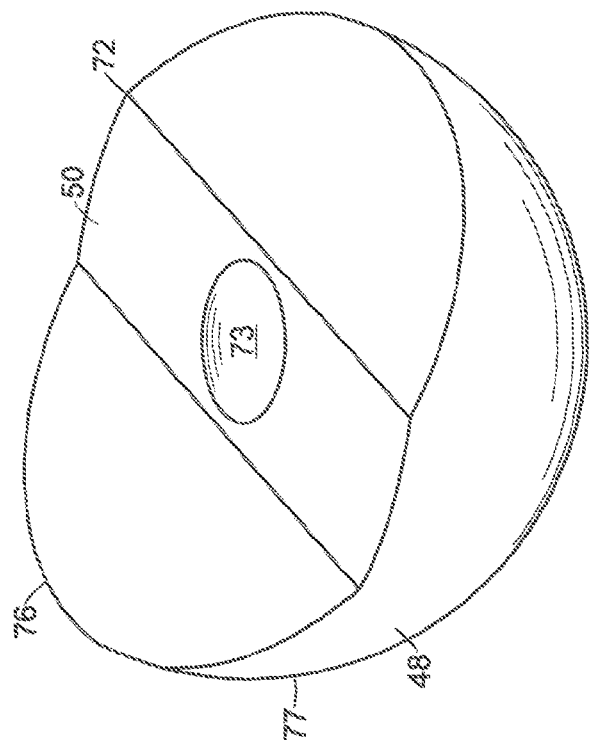
FIGS. 10C and 10H are sectional views of hemispherical cups having nonplanar mating surfaces with ridges which extend from the inner surface to the outer surface in a zig zag pattern.

FIGS. 10B, 10C, 10D, 10E, 10F, 10G, 10H and 10I show alternative embodiments of cups 48 and 54. In each of these figures, mating part or cup 48 has nonplanar mating surface 50 with a pattern of mating ridges 72 which extend radially from the inner surface 73 to the outer surface 76. In FIG. 10B, for example, the mating ridges 72 extend between the inner surfaces 73 and outer surface 76 perpendicularly. In FIG. 10C, mating ridges 72 extend between the inner surface 73 and outer surfaces 76 radially and mating ridges 74 extend between a first location on the outer surface 76 and a second location on the outer surface 76 and are parallel to the radially extending mating ridges 72. In FIG. 10D, the mating ridges 72 extend between the inner surfaces 73 and outer surface 76 in a wave-like pattern on the mating surface 50.

In a finished golf ball, 47 the nonplanar mating surfaces 50 are arranged so that the ridges 72 join and mesh with corresponding ridges of a mating surface on a second outer core part. The mating ridges 72 on mating surface 50 may be either identical to each other or varying in amplitude, height or depth (these terms are used interchangeably herein) as long as those ridges mesh with corresponding ridges on a second mating surface 50. Moreover, the outer core may comprise three or more core parts as depicted in FIG. 10E.

Figure 10F:
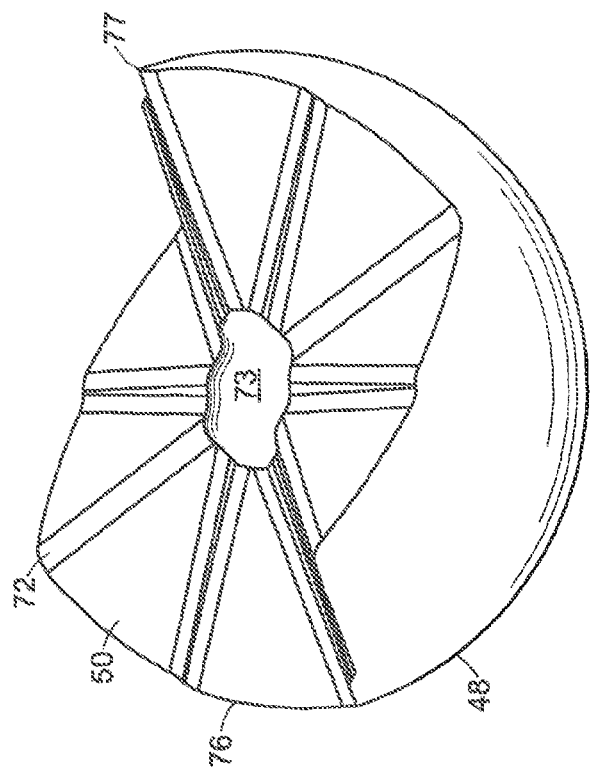
FIGS. 10F and G are sectional views of hemispherical cups having a combination of nonplanar and planar mating surfaces.
Figure 10E:
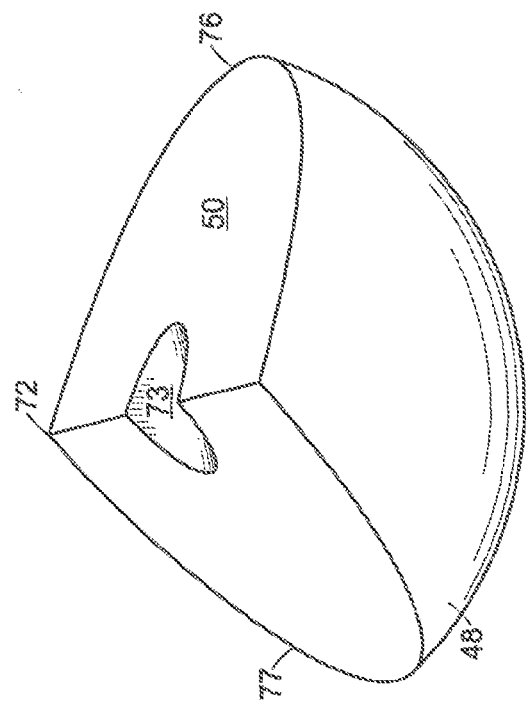
FIG. 10E is a sectional view of an outer core part where the outer core or mantle comprises three mating cups having nonplanar mating surfaces.
Figure 10H:
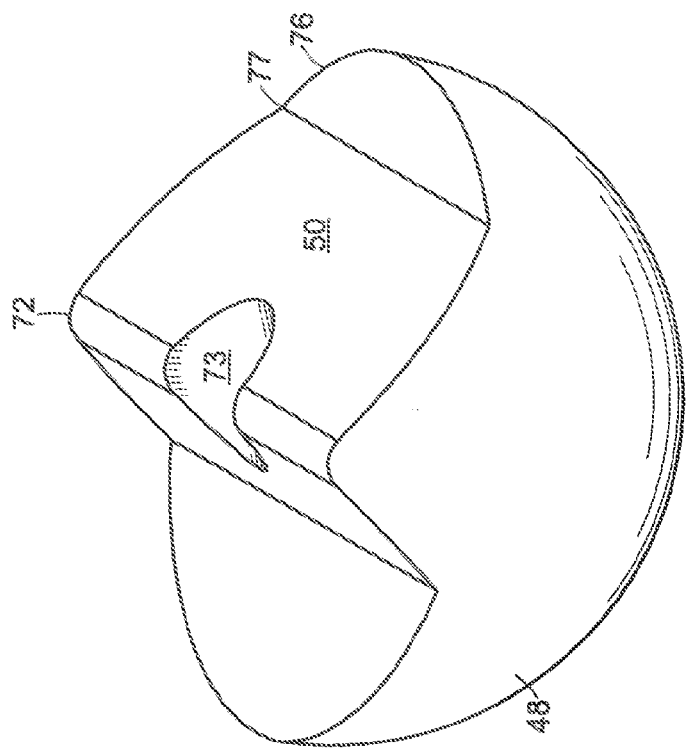
Figure 10G:
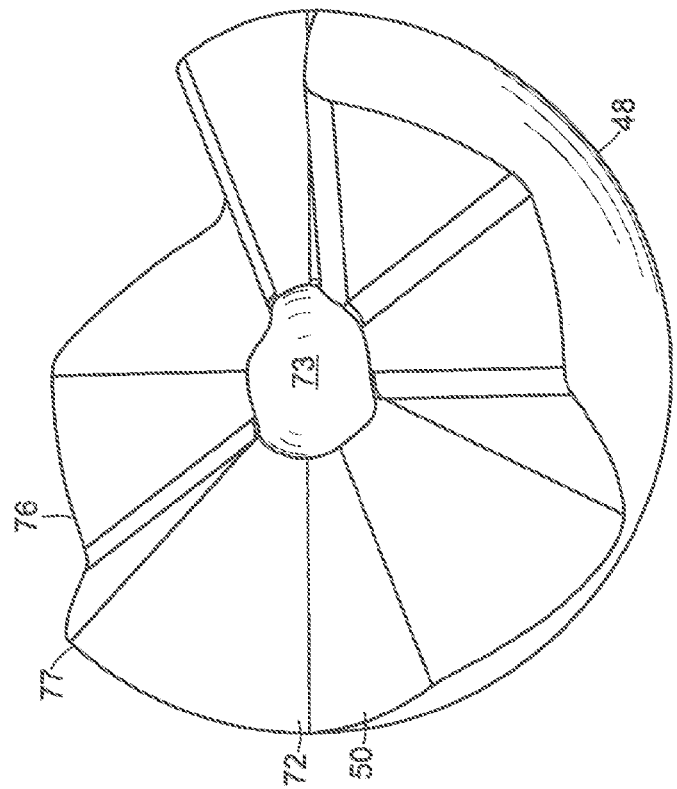
FIG. 10I depicts a sectional view of hemispherical cups having ridges which are shaped like an acute triangle.
FIGS. 10J-10O depict examples of alternative inner core shapes or configurations.
Figure 10J:
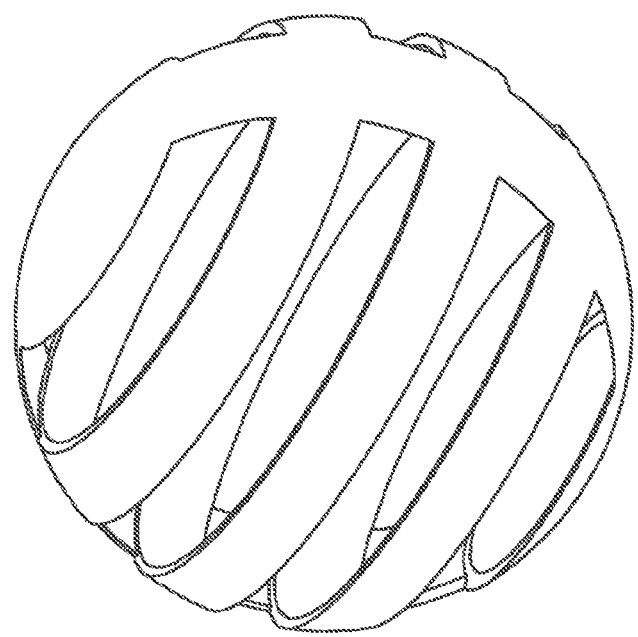
Figure 10I:
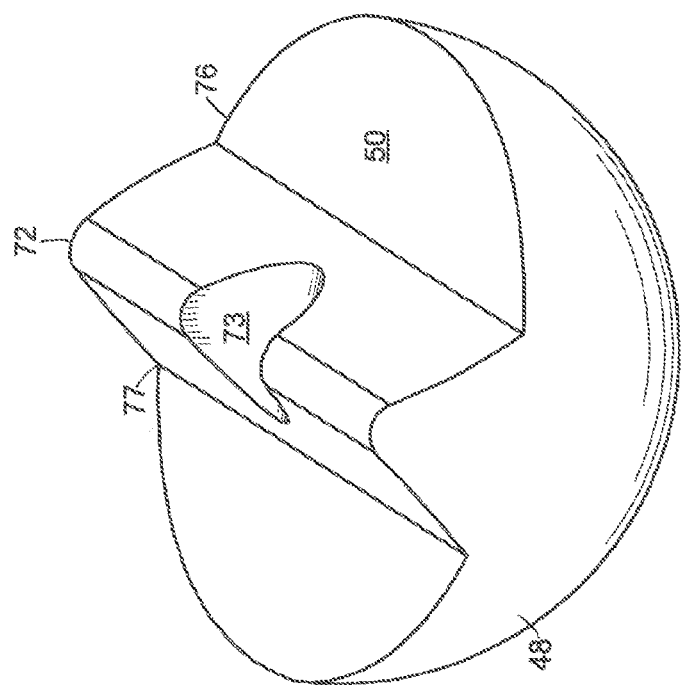
Figure 10L:
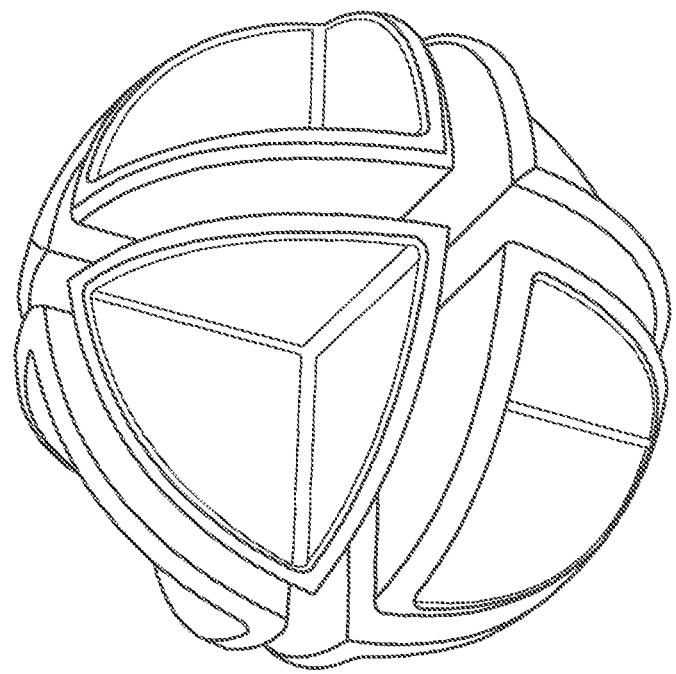
Figure 10K:
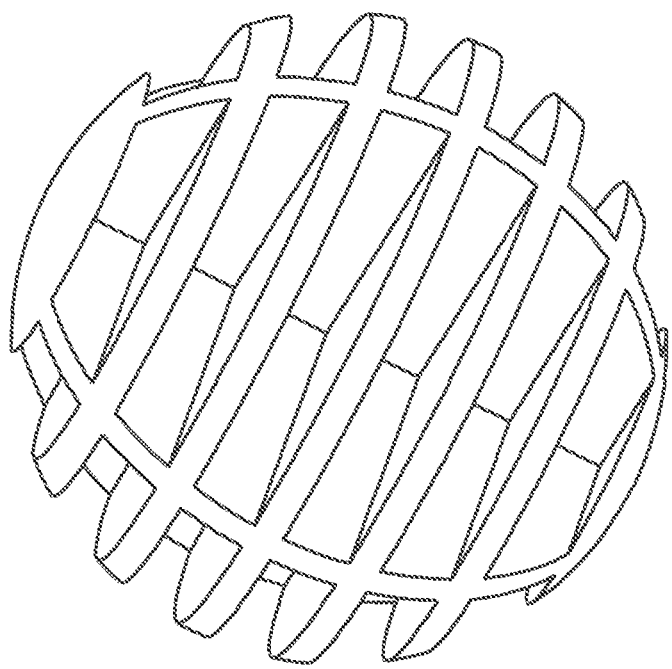
Figure 10N:
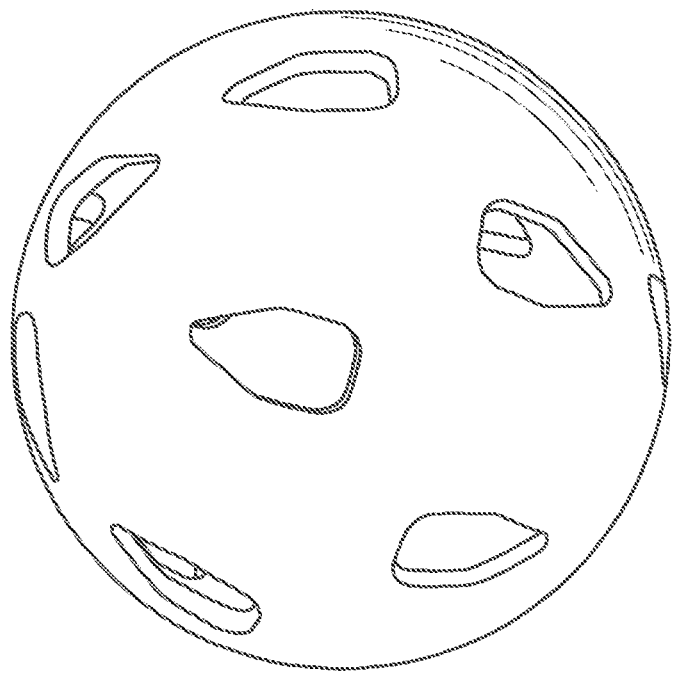
Figure 10M:
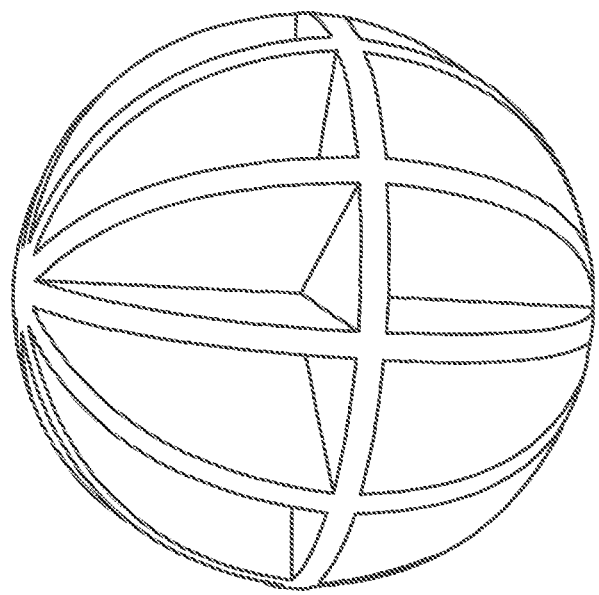

Additionally, as seen in FIGS. 10F and 10G, nonplanar mating surfaces 50 may comprise a combination of planar mating surfaces and nonplanar mating surfaces having ridges with a combination of identical amplitudes and varied amplitudes. These embodiments of FIGS. 10B-10I are in contrast with FIGS. 10 and 11 in which the nonplanar mating surfaces 50, 52, and 56, 58 of cups 48 and 54 have a circular pattern of ridges that are symmetrical about the cavity 44 and concentric with the cups or mating parts 48 and 54 rather than extending radially from an inner surface of the cup to an outer surface. Accordingly, while the mating cups in FIGS. 10A and 11 join to form a planar parting line, the mating cups in FIGS. 10B-10I join to form a nonplanar parting line.

FIGS. 10J-O depict examples of various inner core shapes or configurations.

These nonplanar mating surfaces 50 may be formed by molding the cups 48 with protrusive ridges that have at least one nonplanar surface surrounding their protrusions. However, it is understood that any number of outer core parts or cups may mate to form the outer core, and the outer core parts may comprise any number of ridge designs and may extend from the inner core surface to the outer core surface in any number of patterns to produce nonplanar parting lines 77 which extend around the outer surface 76.

An alternative method for forming the golf balls of the present invention may be as follows. The raw ingredients for the inner core are precisely weighed, batched and fed into the mixer where the materials are combined and heated (150-200° F.). The main material for the core is polybutadiene, a resilient synthetic rubber polymer that is also commonly used in the production of things like automobile tires. Other materials, such as Zinc diacrylite (a binding agent) and peroxide, which serves as a chemical catalyst may be added to the polybutadiene in the mixing process.

The mixed core material is fed into a roll mill machine where the core material is fed between rolling pins. Each rolling pin is filled with 50-60° F. water, which cools the material as it passes through. The material comes off the rollers in flattened sheets, which are then rolled up onto large spools.

The core material is further cooled. The conditioned core material is then fed into a slitter machine that cuts the material into strips, which are then fed into an extruder machine, which squeezes the material into a long cylindrical tube. This material is then sliced, forming cylindrical rods called core pre-forms or core preps.

The core preps are then arranged into the bottom half of a compression mold assembly. The top half of the assembly is fitted onto the bottom half containing the core preps and the entire assembly is loaded into the mold press, where the core preps are heated at 300-350° F. and then compressed into cores. The cores exit the mold press in large sheets, connected together by excess matrix material. The cores are separated from the excess matrix material and cooled The small inner core preps are arranged into the bottom half of a compression mold assembly. The top half of the assembly is fitted onto the bottom half containing the core preps and the entire assembly is loaded into the mold press, where the core preps are heated at 300-350° F. and compressed into inner cores.

After cooling, the molded inner cores go through a centerless, wet-grinding process (on Glebar precision grinding machinery) in which rotating circular wheels remove excess material, grinding the cores smooth to precise size specifications.

The outer core is made by a shell-forming process. Outer core material preps having nonplanar mating surfaces are loaded into the bottom half of a shell compression mold assembly. The top half of the shell assembly is fitted onto the bottom half containing the core preps and the entire assembly is loaded into the mold press, where the core preps are heated at 300-350° F. for up to about 20 minutes and compressed into hollow half-shell shapes. The cavity in this half shell is precisely molded to accommodate the diameter of the inner core and mate with the bottom half. Since the shell assembly may have two or more matable parts, the terms "top half" and "bottom half" are used herein for illustrative purposes only and are not intended as a limitation.

The inner cores, following a centerless grinding process, are now placed inside the bottom half of the outer core shell assembly. The top half of the outer core shell assembly (which also contains outer core shells) is fitted onto the bottom half and the entire assembly is then loaded into the mold press, where the full core assemblies are heated at 300-350° F. for up to about 20 minutes and compressed into inner cores.

The molded cores are cooled and then go through a centerless, wet-grinding process (on Glebar precision grinding machinery) in which rotating circular wheels remove excess material, grinding the cores smooth to precise size specifications.

After centerless grinding, a cover layer is applied around the finished core by a thermo-plastic injection molding process. If shell injection molding process is used, a semi-liquid material is injected into cover molds, creating two hollow shells. The shells are assembled and welded around the finished golf ball core. Then, the casing layer will be heated, formed and cured around the core by a compression molding process.

Where a retractable pin injection molding process is used, finished cores are placed into the bottom half of a mold. Once the top half of the mold descends and closes tightly over the bottom half, liquid is injected into the mold cavity where it will cure around the core. Once cured, excess casing matrix material will be automatically removed.

After the casing layer has been applied around the finished cores, the cased cores return to a centerless, wet-grinding process (on Glebar precision grinding machinery) in which rotating circular wheels remove excess casing layer material, grinding the cased cores smooth to precise size specifications. Once buffed smooth and washed, the cased cores enter a cover casting process. The cover material is then allowed to cure, resulting in a cover on the final golf ball.

After the cover casting process, balls enter the buffing operation, where any excess cover material is removed from the parting line where the two cover mold halves came together.

The small diameter solid inner core or small diameter liquid center shell and mantle layers in the mantle portion 16 of golf balls with nonplanar mating surfaces retain more of the properties of the elastomers that form the cups, when the cups are forced in shear with respect to each other, as compared to a golf ball with flat mating surfaces. Nonplanar mating surfaces are thus advantageous when an adhesive is used or other that has an adhesive strength lower than the cohesive strength of the elastomeric cup material. This is because the meshed portions of the cups 48 and 54 aid in resisting shearing forces between the two cups 48 and 54.

Various examples of golf ball cores according to the invention are set forth below.

EXAMPLES

The following prophetic examples are illustrative of the invention:

Example 1

A core according to the present invention may be created having a solid single layer inner core and a solid single layer outer core part disposed about the solid inner core.

The solid inner core may comprise a thermoplastic material such as HNP and have a diameter of approximately 0.38 inches.

The outer core may comprise polybutadiene and have a thickness of approximately 0.60 inches. The outer core part ridges extend radially from the inner surface the ridges of each hemisphere and are matable with each other to create a core having an outer diameter of about 1.58 inches.

Example 2

A core according to the present invention may be created comprising a two layer inner core having a liquid center, a shell surrounding the liquid center, and a single layer outer core comprising two hemispheric cups disposed and mated about the liquid center shell.

The diameter of the liquid center may be 0.30 inches and the thickness of the shell being 0.10 inches for a total liquid outside diameter of 0.50 inches. The thickness of each hemispheric cup may be about 0.54 inches. The two hemispheric cups will be joined at their respective mating surfaces along mating ridges which extend radially along each hemispheric cup from the inner surface to the outer surface.

The liquid core may be a salt, water and corn syrup solution comprised of 40% salt, 30% water and 30% corn syrup. The liquid center shell may be created from a thermoplastic elastomer. The outer core part may be created from crosslinked polybutadiene Unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the preferred embodiments of the present invention, it is appreciated that numerous modifications and other embodiments may be devised by those skilled in the art. Examples of such modifications include reasonable variations of the numerical values and/or materials and/or components discussed above. Hence, the numerical values stated above and claimed below specifically include those values and the values that are approximate to those stated and claimed values. Therefore, it will be understood that the appended claims are intended to cover all such modifications and embodiments, which would come within the spirit and scope of the present invention.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. For example, the compositions of the present invention may be used in a variety of equipment. Such modifications are also intended to fall within the scope of the appended claims.

We claim:

1. A golf ball having a diameter and being comprised of a core and a cover, wherein the core is further comprised of a fluid mass at the center of the ball, a first, solid, non-wound mantle layer surrounding the fluid mass and a second, solid, non-wound mantle layer surrounding and abutting the first mantle layer, wherein the first mantle layer comprises a metal layer and the second mantle layer comprises a copolymer or terpolymer of ethylene and a α,β-unsaturated carboxylic acid, the acid being neutralized at least 80% by a salt of an organic acid or a suitable base of the organic acid, and a cation source, and wherein the cover comprises polyurethane, polyurea, or a polyrea/polyurethane hybrid.

2. The golf ball of claim 1, wherein the polymer composition acid being neutralized by contacting one or more acid polymer(s) with an organic acid or metal salt of an organic acid and a sufficient amount of a less hydrophilic cation source such that at least 90% of all acid functionalities present in the polymer composition are neutralized.

3. The golf ball of claim 2, wherein about 100% of all acid functionalities present in the polymer composition are neutralized.

4. The golf ball of claim 2, wherein the acid polymer is partially neutralized prior to contact with the less hydrophilic cation source.

5. The golf ball of claim 2, wherein the less hydrophilic cation source is selected from metal ions and compounds of potassium, cesium, calcium, barium, manganese, copper, zinc, and tin; silicone, silane and silicate derivatives and complex ligands; and metal ions and compounds of rare earth elements.

6. The golf ball of claim 1, wherein the second mantle layer has a thickness of about 0.04 to 0.35 inches.

7. The golf ball of claim 1, wherein the second mantle layer further comprises polybutadiene.

8. The golf ball of claim 1, wherein the second mantle layer has a Shore C of 45 to 90.

9. The golf ball of claim 1, wherein the fluid mass is a gas, liquid, gel, paste or a combination thereof.

10. The golf ball of claim 1, wherein the specific gravity of the fluid mass is about 1.3 to 1.55.

11. The golf ball of claim 1, wherein the viscosity of the fluid mass is about 100 to 1500 cps.

12. The golf ball of claim 1, wherein the first layer has an inner diameter of about 0.25 to 1.5 inches and the second mantle layer has an outer diameter of about 1.3 to 1.65 inches.

13. The golf ball of claim 12, wherein the inner diameter is about 0.5 to 1.35 inches and the outer diameter is about 1.45 to 1.62 inches.

14. The golf ball of claim 1, wherein the golf ball has a rate of spin decay of at least 10% of the initial spin rate over the entire ball flight.

15. The golf ball of claim 14, wherein the golf ball has a rate of spin decay of at least 15% of the initial spin rate over the entire ball flight.

16. The golf ball of claim 1, wherein the core has a compression of 87 or less.

17. The golf ball of claim 1, wherein the cover comprises an inner cover layer and a thin outer cover layer, wherein the outer cover layer comprises a thermoset material formed from a castable, reactive liquid and the inner cover layer comprises a high flexural modulus material.

18. The golf ball of claim 1, wherein the golf ball has a COR of at least 0.8.

19. The golf ball of claim 1, wherein the first layer has a moisture vapor transmission rate of 8 g-mil/100 in$^2$/day or less.

20. The golf ball of claim 19, wherein the first layer has a moisture vapor transmission rate of 2 g-mil 100 in$^2$/day or less.

* * * * *